(12) United States Patent
Weisman et al.

(10) Patent No.: US 6,839,417 B2
(45) Date of Patent: Jan. 4, 2005

(54) METHOD AND APPARATUS FOR IMPROVED CONFERENCE CALL MANAGEMENT

(75) Inventors: Jordan K. Weisman, Redmond, WA (US); William G. Redmann, Glendale, CA (US); Brian Elan Lee, Seattle, WA (US)

(73) Assignee: Myriad Entertainment, Inc., Oakland, CA (US)

( * ) Notice: Subject to any disclaimer, the term of this patent is extended or adjusted under 35 U.S.C. 154(b) by 89 days.

(21) Appl. No.: 10/238,401

(22) Filed: Sep. 10, 2002

(65) Prior Publication Data

US 2004/0047461 A1 Mar. 11, 2004

(51) Int. Cl.[7] .................................................. H04M 3/42
(52) U.S. Cl. .................................. 379/204.01; 455/416
(58) Field of Search ....................... 379/204.01, 202.01; 455/416

(56) References Cited

U.S. PATENT DOCUMENTS

| | | | |
|---|---|---|---|
| 4,076,966 A | 2/1978 | Bovo et al. | |
| 4,280,216 A | 7/1981 | Zeitrag | |
| 4,455,455 A | 6/1984 | Little | |
| 4,809,262 A | 2/1989 | Klose et al. | |
| 4,907,221 A | 3/1990 | Pariani et al. | |
| 4,984,263 A | 1/1991 | Eun | |
| 5,029,162 A | 7/1991 | Epps | |
| 5,034,947 A | 7/1991 | Epps | |
| 5,054,021 A | 10/1991 | Epps | |
| 5,127,001 A | 6/1992 | Steagall et al. | |
| 5,373,549 A | 12/1994 | Bales et al. | |
| 5,408,526 A | 4/1995 | McFarland et al. | |
| 5,440,624 A * | 8/1995 | Schoof, II | 379/202 |
| 5,450,481 A | 9/1995 | Penzias | |
| 5,483,587 A | 1/1996 | Hogan et al. | |

(List continued on next page.)

FOREIGN PATENT DOCUMENTS

| | | |
|---|---|---|
| EP | 0561649 A | 9/1993 |
| WO | WO 0128213 A | 4/2001 |

*Primary Examiner*—Creighton Smith
(74) *Attorney, Agent, or Firm*—George C. Rondeau, Jr.; Brian L. Johnson; Davis Wright Tremaine LLP

(57) ABSTRACT

A method and apparatus are disclosed to allow individuals to initiate, join, manage, and participant in a conference call. Members of a community can meet and collaborate over telephones, especially cellular telephones, or computer workstations, in a way that is freeform or prescribed, automatic or moderated, spontaneous or scheduled, unassisted, and selectably anonymous. The invention provides broadly customizable degrees of collective and individual organizational control, and provides social safeguards to minimize disruptions by unruly participants.

59 Claims, 5 Drawing Sheets

U.S. PATENT DOCUMENTS

| | | |
|---|---|---|
| 5,546,449 A | 8/1996 | Hogan et al. |
| 5,631,904 A | 5/1997 | Fitser et al. |
| 5,724,416 A | 3/1998 | Foladare et al. |
| 5,729,532 A | 3/1998 | Bales et al. |
| 5,878,118 A | 3/1999 | Mohr |
| 5,881,053 A | 3/1999 | Kimball |
| 5,903,637 A | 5/1999 | Hogan et al. |
| 5,973,724 A | 10/1999 | Riddle |
| 5,978,467 A | 11/1999 | Walker et al. |
| 5,995,608 A | 11/1999 | Detampel, Jr. et al. |
| 5,995,827 A | 11/1999 | Gitlin et al. |
| 6,035,026 A | 3/2000 | Kim |
| 6,049,531 A | 4/2000 | Roy |
| 6,076,100 A | 6/2000 | Cottrille et al. |
| 6,078,658 A | 6/2000 | Yunoki |
| 6,081,513 A | 6/2000 | Roy |
| 6,088,435 A | 7/2000 | Barber et al. |
| 6,125,178 A | 9/2000 | Walker et al. |
| 6,161,134 A * | 12/2000 | Wang et al. ............... 709/220 |
| 6,175,619 B1 | 1/2001 | DeSimone |
| 6,181,786 B1 | 1/2001 | Detampel, Jr. et al. |
| 6,192,119 B1 | 2/2001 | Wilson |
| 6,236,644 B1 | 5/2001 | Shuman et al. |
| 6,236,854 B1 | 5/2001 | Bradshaw, Jr. |
| 6,262,979 B1 | 7/2001 | Anderson et al. |
| 6,275,575 B1 | 8/2001 | Wu |
| 6,282,278 B1 | 8/2001 | Doganata et al. |
| 6,304,648 B1 | 10/2001 | Chang |
| 6,314,178 B1 | 11/2001 | Walker et al. |
| 6,317,776 B1 | 11/2001 | Broussard et al. |
| 6,330,320 B1 | 12/2001 | Cornell et al. |
| 6,330,321 B2 | 12/2001 | Detampel, Jr. et al. |
| 6,349,136 B1 | 2/2002 | Light et al. |
| 6,353,662 B1 | 3/2002 | Foladare et al. |
| 6,389,114 B1 | 5/2002 | Dowens et al. |
| 6,392,999 B1 | 5/2002 | Liu et al. |
| 6,400,381 B1 | 6/2002 | Barrett et al. |
| 6,633,848 B1 * | 10/2003 | Johnson et al. ............. 704/227 |

* cited by examiner

METHOD AND APPARATUS FOR IMPROVED CONFERENCE CALL MANAGEMENT

FIELD OF THE INVENTION

The present invention relates generally to a way to manage conference calls, and in particular, to allow a community of individuals to initiate, join, and participate in a conference call. More particularly still, the invention relates to a system for allowing autonomous, potentially unknown, members of a community to meet and collaborate over telephones, especially cellular phones, in a freeform, automatic, unassisted, and unscheduled way, and yet retain collective and individual degrees of organizational control.

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO COMPUTER PROGRAM LISTING APPENDICES

Not Applicable

BACKGROUND OF THE INVENTION

Voice is the single most effective means of communication available to human beings. The vocabularies available to each of us, perhaps over multiple languages, exceed in variation and speed our written words. How something is said can be more important than the words themselves. The verbal ability to convey emotion is unparalleled in other modes. The conciseness of a simple grunt (Uh? Uhuh. Ew! Hmm. Ow!) interjected into someone else's narrative—without interrupting—can enable a speaker, especially an actor or comedian, to gauge the audience's response. Interest can provoke elaboration. Boredom, or agreement, can suggest that the conversation could be moved along more rapidly.

In a standard, two-station telephone call, all the cues of voice communication are available. This is why almost everyone has a telephone. In fact, most families have several. With the advent of cellular technology, many people carry a telephone with them everywhere, so that the power of verbal communication is available to them wherever they go.

Conference Calls

Many telephone services offer the ability to join two calls together. Tom calls Dick, puts Dick on hold, Tom calls Harry and then restores Dick—the three participants, each on their own phone, can now have a conversation together. In such a case, Tom fills the role of "organizer" and all three are "participants."

The majority of telephone owners, however, don't undertake such three-way calls. The specific sequence of keypad or switchhook presses is forgotten when rarely used, and the likelihood that an error in the sequence hangs up on someone causes most people to forego the value of three-way calling. The role of organizer is not popular, and it gets worse.

Conference calling services go beyond three-way calling, though three-way calling (except on a multi-line telephone) is just a special case of conference calling. Conference calling services allow three or more people to participate in a single call. Systems to provide conference calling are many, and well known to those skilled in the art. Such systems come in many varieties, and provide conference services over and between different telephone and network systems.

Note that, in general, it is not a requirement that an organizer also is a participant, but in the case of three-way calling, above, it is a requirement.

Bovo et al., in U.S. Pat. No. 4,076,966 teaches a basic implementation for multi-way calling. Each call participant hears the all the other participants' voices added together. The adding together is performed by a special, central conference circuit. The conference circuit receives all of the participants' voices separately. For each individual participant, the circuit adds together the voices of all the other participants, and sends that composite signal. Thus, what Tom hears is (Dick+Harry), and what Dick hears is (Tom+Harry), etc. Another circuit having similar effect is taught by Epps in U.S. Pat. No. 5,054,021.

In a switched packet network, data packets representing the voice of each of the other participants is sent directly to a participant's station. This is shown by Steagall et al., in U.S. Pat. No. 5,127,001. The packets from a given participant are sorted into an allocated bin. At any given moment, the next packet from each of the bins is decompressed, the voice signals from each of the other participants is added together locally, and played to the local participant. Such a technique can be used over the Internet.

In U.S. Pat. No. 6,275,575, Wu teaches that a conference call can take place across dissimilar platforms: cellular telephones, standard telephones, and the Internet.

Because of cost and complexity, three-way calling and conference calling are most commonly found in the business arena. Having three or more people talking together over the telephone can save much of the time and expense otherwise needed to transport and gather those people for a meeting. These savings are significant enough that special equipment may be purchased. An assistant, often having nothing to do with the meeting, is designated to organize the conference call. In some systems, an operator is also needed.

Many ways are known to manage the arrangement and initiation of a conference call.

According to Little, in U.S. Pat. No. 4,455,455, an organizer would schedule a conference through an operator. The operator provides the commands that will configure a switch to form the conference call at the appointed time. The participants are provided in advance with a special access number to dial, and a password number. At the appointed time, each of the participants is responsible for dialing into the switch using the access number, and then providing the password to join the conference call.

McFarland et al., in U.S. Pat. No. 5,408,526, suggests that the organizer of the conference call supply the count of participants will be in the conference call, a phone number for each, and the time and duration of the conference call. Such information is necessary to permit the conference system to find an effective, efficient allocation of conference call circuits. Ideally, at the time of the conference, each of the participants is connected. Fitser et al., in U.S. Pat. No. 5,631,904 is less formal. Given the list of participants' numbers, the conference circuit simply calls each participant. They can even be charged for the call!

Wu's system, from U.S. Pat. No. 6,275,575, takes similar information, but invites the participants to join a future conference call. The organizer can view the status of those invitations, whether accepted, declined, or outstanding. The invitation may be via pager, email, or WAP enabled cellular telephone. The responses to the query are made available to the organizer, and at the appointed time, each of the participants is called. Further, Wu allows any or all of the organizer and participants to be on cellular telephones, though ideally, the organizer uses a personal computer connected to the Internet.

Sometime the role of organizer is sufficiently complex as to fall to more than one person, for instance when groups of participants from each of two companies are required. For such circumstances, says Bales et al. in U.S. Pat. No. 5,373,549, distinct organizers each form their own conference call and gather their own participants. Then, the two conference calls are merged into a single conference call. The organizers retain control over their original participants, and either organizer can re-divide the conference call into its original constituent conference calls. Riddle, in U.S. Pat. No. 5,973,724 teaches an alternative method, which emphasizes multimedia teleconferences over a network.

Other mechanisms have been provided for joining a conference call.

Barber et al., in U.S. Pat. No. 6,088,435, accepts a request for a conference call related to a topic of interest to the requester. If a conference call is already in progress on that topic, the requester becomes a participant in that conference call. If no conference call is in progress on that topic, a database is examined to find someone whose personal profile (e.g. gender, address, telephone number, interests, access to video phone, etc.) suggests that they would be interested. If such a profile is found, and is enabled, a call is automatically placed to the person found. This initiates a conference call tagged with that topic of interest is initiated with the original requester and the person selected from the database as the initial participants.

Walker et al., in a series of US patents (U.S. Pat. Nos. 5,978,467; 6,125,178; 6,314,178) shows that callers waiting in queue for a service agent, can be connected to each other to see if among themselves they can handle their own problems. The callers retain their original place in queue for when an agent becomes available.

In U.S. Pat. No. 6,175,619, Desimone describes a system to allow Internet an chat room participants to initiate a conference call and invite other of the chat room's participants to become participants in the conference call. Participation in the conference call does not require the participants to relinquish their anonymity.

Conference Call Etiquette

When a conference call is in progress, there are problems that do not arise in ordinary face-to-face conversation.

In face-to-face conversation, it is usually apparent how many participants are in a room, and when a participant leaves the room. Similarly, one can usually tell who is presently speaking. However, such is not necessarily the case in a conference call. To remedy this, Penzias, in U.S. Pat. No. 5,450,481, teaches a system having a conference tracker at each participating station. The tracker employs a series of audio pulses to uniquely indicate its presence and status (e.g. speaking or silent) to each of the other trackers. In this way, Penzias' system can indicate how many and which participants are connected, and which participants are presently speaking.

In U.S. Pat. No. 6,304,648, Chang teaches a system wherein the voice of a speaking participant causes a signal to be generated which displays the identity of the speaking participant on a web site used by the organizer to originate the conference call. The speaker's identity can be represented by video, a photo, or merely the speaker's name.

In face-to-face conversation, it is sometimes the case that environmental background noise makes conversation difficult. Environments where this is likely to occur include sporting events, rock concerts, and busy restaurants. In a conference call, not only are the voices of the participants added together, but also each of the participant's environmental background noises. Thus, a participant in a busy restaurant brings to the conference call the background noise of a busy restaurant. A participant using a cellular telephone on the freeway will bring traffic and wind noises.

A similar situation can occur if a participant puts the conference call on hold, perhaps to take a priority call. Many business telephone systems feature "delightful music on hold," which now dominates the conference until the participant returns. Foldare et al., in U.S. Pat. No. 6,353,662 teaches how this can be mitigated by a smarter music-on-hold system. Light et al., in U.S. Pat. No. 6,349,136 teaches that the "controller," a specially authorized participant (who is perhaps the organizer), can enter a code and be isolated from the conference. Once isolated, the controller can examine in sequence the signal coming from each participant. When one is found having excessive noise, the controller can enter another code and the noisy participant is dropped from the conference call. In another patent, U.S. Pat. No. 5,724,416, Foldare et al. teach that a participant having an overly loud environment can use a touch-tone key to stimulate the conference call circuit to balance the audio levels.

Even low levels of background noise can, when summed over many participants, result in a disruptive amount of noise. Addressing this issue, Klose et al., in U.S. Pat. No. 4,809,262 has the conference call circuit evaluate the signal from each participant. If the signal is low, the participant is presumed to not be speaking and the signal is muted. Thus, background noise from non-speaking participants is eliminated. An alternative method used in wireless communications is presented in U.S. Pat. No. 5,881,053, where Kimball encodes each participant's voice. When a participant is not speaking, the encoding takes place at a drastically reduced bandwidth. The system provides maximum fidelity to the current speaking participant, however. Gitlin et al., in U.S. Pat. No. 5,995,827 allows a wireless telephone to mute itself when the participant stops speaking.

In face-to-face conversation, two participants can whisper privately between themselves while remaining aware of the collective conversation. Epps, in U.S. Pat. No. 5,034,947 provides a circuit for a similar effect during a conference call (but no user interface for accessing the effect). Though not quite analogous to whispering, Bradshaw, Jr., in U.S. Pat. No. 6,236,654, allows the "controller" participant to break a conference call into sub-conferences, and specifically, to have a private conversation with one of the other participants.

Thus, many of the problems specific to conference calling have had solutions presented. However, there remain other problems specific to conference calls. Further, conference calls exhibit problems that are present in ordinary, face-to-face conversation.

In large, face-to-face gatherings, it is often difficult to maintain a single thread of conversation. Let alone those whispering: Arguments and shouting matches can break out. In a conference call, especially when lacking visual cues and suffering a significant fraction of a second of latency, talking over someone and stepping on their sentence is common. Yet the rigors of military radio communication (terminating each completed utterance with "Over") or the formality of Robert's Rules of Order ("the chair recognizes Harry") are unlikely to be adopted. As a result, it is a frequent occurrence, whether accidental or deliberate, that multiple participants will be talking simultaneously.

In some face-to-face meetings, the rules limit individual speakers to a maximum speaking time. For example, this is common practice in public hearings or annual stockholders meetings. Enforcing such limits, even in conference calls, is the domain of the moderator. Conference call systems do not have an automated mechanism for this.

It is also the case, in face-to-face conversation, that there are some individuals with whom one would prefer not to speak. Perhaps it is because one dislikes the way they express themselves, or because they are rude. In a business context, it may not be appropriate to avoid a conference call because of a participant. However, in a recreational context, one may wish to avoid joining conference calls having certain participants. Conversely, one may prefer to join conference calls have certain participants, e.g. your friends.

There exists a corollary problem. In a conversation where one discovers that a participant is distasteful, one often wonders, "Who invited you?" It may be the case that, as a participant, one finds certain organizers unsuited to the role. Beyond knowing who are the participants in a conference call, it would be useful to determine which organizer included each of them. For the opposite reason, information concerning a particular, excellent participant would allow the discovery of excellent organizers.

It is an additional attribute of a face-to-face conversation that if some participant begins to make injurious remarks, that participant can be pressured by peers to apologize, and potentially served with a lawsuit if the remarks were libelous. In a conference call, particularly one where the participants are anonymous, though immediate peer pressure is available, the threat of legal action is absent. It is desirable for claims of libelous or otherwise unsavory statements to be researchable by appropriate authorities, so that the controls imposed by the potentiality of legal action is restored.

Though rare in a business context, it occurs at certain social or recreational events, such as a masquerade ball, that face-to-face conversations take place, and yet the speakers are mutually unaware of each other's identity. In a face-to-face masquerade conversation, a participant is wearing a mask or costume appropriate to the event, and may further undertake to disguise their voice. In a less extreme example, sports fans seated near each other at a game or in a bar may converse to great extent, and yet not exchange any personal information beyond their first names. They are comfortable with the relative anonymity that being one of many thousands of fans affords (even if other participants could pick them out of a hypothetical line-up).

Often, at a party or in a bar, while engaged in a face-to-face conversation, one attempts—without interrupting or leaving the conversation—to attract the attention of a friend and induce them to join. Typically, this is performed with a beckoning wave of the hand, a tipping up of the head, or a gesture with the eyebrows (depending on the degree of subtlety required.) The same informality and subtlety is not available in conference calls. Invitations are the domain of the organizer, who is required to enter particular modes in order to gather new participants. These modes prevent the organizer from remaining as a participant in the conference call for the duration of his organizational activities. In addition, the formality of such an invitation, whether before or during a conference call, does not admit to extension by second or higher degree invitees (i.e. participants invited by participants invited by the organizer). In a face-to-face meeting, one can direct an invitee to listen, but not speak. Existing conference call mechanisms treat participants as having equal speaking and listening capabilities—existing systems do not enforce such constraints on participants.

Similarly, in face-to-face conversations, gestures, nods, and winks, in addition to whispering, are modes of communication with individual other participants which do not interrupt the flow of conversation in the overall conference call. Present conference call systems do not admit analogous back channels of communication, with the exception of whispering, described above.

In a large gathering, it is possible to "keep your ears open." In this state, an individual participating in one face-to-face conversation pays fractional attention to other conversations of interest. If one of the other conversations takes a twist of overriding interest, participation is transferred to the other, more interesting conversation. Such monitoring of multiple conversations is not available to conference call participants, outside of having multiple telephones.

Another form of social conversation, past its heyday, was popularized in United States, during the 1970s' consumer electronics boom in Citizen Band radios (CBs). Many conversational idiosyncrasies evolved around the 40 channel, two-way, moderate range, no-license-required radios. Among CBers, as participants were called, there was a monitoring mode called "keeping your ears on." In this mode, a CBer would monitor a single channel and waiting for another CBer to appear. Some CB radios had scanners, which would poll through some, or all 40, channels looking for activity. By tradition, certain channels tended toward certain subjects. For instance, channel 9 was reserved for emergencies. A CBer newly arriving on a channel would himself by saying, "Breaker, breaker." Present conference call systems do not offer any analogous behavior for recreational use.

One flaw in CB communication is that multiple, simultaneous transmissions corrupt each other. Rather than hearing two simultaneous voices, a receiver detect one or the other (typically the stronger signal), or garbage, if the two signals corrupt each other.

Another valuable artifact of CB communication is due to its limited range. Because CB radio communication is typically limited to a few dozen or so miles, parties engaging in conversation share geographic proximity. By virtue of that fact, proximity specific questions such as "Where is a good place to eat?" or "How is traffic?" more naturally find parties having pertinent opinions or information. Conference call systems do not offer a mechanism for constraining geographic location of participants.

An essential attribute of CB radio is that its operation is non-commercial. While a CB station can be used in the pursuit of a business, one cannot receive income for the use of CB, nor can a CB be used to transmit entertainment or other broadcast programming. A conference call, on the other hand, is not subject to such constraints.

Summary of Needs Unsatisfied by Prior Art

Thus, in spite of the amazing array of conference call capabilities available to telephone and cellular telephone users, there remain unsatisfied needs.

During a conference call, there exists a need for a method to allow a speaker to be heard clearly by all other participants, and yet still permit those other participants to make comments and utter their verbal reactions to be heard by all participants, including the speaker.

In a conference call, there is a need for a way to designate a participant as the speaker, and to pass such designation to subsequent participants.

Further, a mechanism that can be employed to limit the time each speaker is permitted is needed. Such a mechanism should provide a clear status display at least to the current and subsequent speaker.

A way is needed for a participant to designate other individual participants as undesirable, and subsequently to avoid joining, or at least be forewarned before joining, a conference call having a participant so designated.

Similarly, a technique is needed for a participant to designate other individual participants as desirable, and subsequently to be notified, when searching for a conference call, of the presence of a participant so designated.

Further, in a conference call having one or more organizers, or in which an invitation mechanism has led a particular participant to join, a technique is needed which will allow other participants to determine which organizer(s) or other mechanism provided an invitation for that particular participant.

Further, in conference calls, there is need for a way to provide peer pressure, up to and including the force of law, to enforce civility.

In a conference call, where the participants' identities are known to the conference calling system, a way is needed to maintain privacy and yet still provide each participant with an awareness of the other participants, including the speaker, via an alias. In a system employing such an alias, there is a need for the alias to have a public part, analogous to a mask or costume, which provides a degree of anonymity, but is distinguishable within a conference call from other participants using their respective aliases. In addition, it is desirable for an alias to have a private part, which may include the participant's true identity. Whether a participant is represented by the public part (mask) or private part (true identity) is selectable by that participant. It is further needed to enable a participant having an alias to specify which other participants may view the private part (true identity) of the alias. There is also a need for a participant to have multiple public aliases, which may be selected manually or automatically by context. A concomitant need is for a PC based design tool, which will allow a user to create or edit an alias.

In addition to the alias used to maintain privacy, there is also a need to provide a disguise for the voice of a participant. Such a disguise may optionally be dropped for those other participants begin designated as having access to the alias' private part.

Because of the difficulty of arranging conference calls and adding participants during one, there exists a need for a simple way to invite someone to join an upcoming or ongoing conference call. Further, there is a need for the ability for invited participants to invite additional participants is needed, including the ability to invite additional participants. Still further, an invitation mechanism that invites participants, but limits them as observers, or other alternative mode to full participation.

Further, a back channel of communication between specific participants, which does not interrupt the conference call, is needed. Such a back channel might include manipulation of the alias one directs toward a particular participant, so as to represent meaningful expressions.

There is a need for conference call technology to emulate communication format provided by CB channels. When joining a conference call representative of a CB channel, and that conference call having no designated speaker, the effect of a "breaker" message is desired to notify monitoring participants of a new participant's arrival. There is a need for a way to manage the problems of multiple participants trying to speak at once. There is a further need to allow a participant to designate those one or more conference calls to be monitored, even when participating in a particular conference call.

Additionally, there is a need to constrain participation in a conference call to participants having geographic proximity to some location. It can be the case that the location for determining proximity is the locus of the participants' locations. Alternatively, the location for determining proximity may be fixed, e.g. a stadium or concert. The constraint of geographical proximity is needed to promote the development of geographically desirable friendships. Further, such a constraint is needed to limiting participation to those likely to benefit from an ad hoc community generated by the conference call regarding an event or location (e.g. by promoting interchange of geographically local information such as traffic conditions, shortest queues, best restaurants, open party locations, etc.)

There is lastly a need for topic-based conference call programs. Such calls might be continuously on-going, awaiting participants (e.g. a channel based on a particular sports team), they could be pre-scheduled and promoted (e.g. a panel discussion, post-game discussion group, or a book club), or they might be ad hoc. In some cases, such conference calls would need to be available exclusively to subscribing participants.

The present invention satisfies these and other needs and provides further related advantages.

OBJECTS AND SUMMARY OF THE INVENTION

The present invention relates to a system for managing conference calls by allowing a potentially anonymous community of individuals to participate in a conference call. Participants, especially those using cellular telephones, may meet and collaborate in an automatic, unassisted, and unscheduled way, and yet both the individual participants and the collective community retain degrees of organizational control.

Each participant has a station, consisting of at least a telephone, a processor, a display written by the processor, and controls provide the participant with input to the processor. The telephone and processor are in communication with other participant stations via a conference server. This communication occurs over one or more channels such as a hardwired telephone line, a wireless connection, network, or Internet. A Voice-Over-Data service may be employed.

Though a traditional telephone keypad can suffice, it is preferable that the controls consist of an additional input device for convenient entry of selections and preferences. The telephone keypad, a keyboard, a mouse, a joypad and buttons, a pen interface, or voice command system are some of the many viable input devices. Each has strengths and weaknesses.

The display is used by the processor to show current preferences and selections made by the participant, to show conference calls available for participation, and to indicate the status of ongoing conference calls.

Through the processor, the participant can request and control participation in a conference call of the participant's choosing.

The conference server provides a clearinghouse of conference call and participant data. Conference call data may include representations of the subject matter, conference mode, current status, voice bridge address, and current participant list.

The conference mode determines the behavior of the conference call manager, such as what is the maximum number of participants allowed, or how is the conference moderated, etc. Participant data may include a displayable name or pseudonym for each current participant.

One data element comprising the current status is the identification of which participant bears the designation of "speaker."

The conference server is also responsible for providing, for each participant, a combination of the other participants' voices. When a speaker is designated, this combination ensures that the speaker's voice is able to dominate the combination for each of the other participants. Even so, the other participants are still audible within the combination, and the other participants are preferably audible to the speaker. Processing of the participant voices, including without limitation normalization, noise gating, and disguising, is preferably performed by the conference server, but may be performed entirely or partially by the participant station.

Another data element comprising the current status is the designation of "moderator." The moderator is primarily responsible for determining the succession of speakers. A moderator may also have control over the ability of participants to join the conference call. A participant may be the moderator. When this is the case, the moderator may be a specific participant, or the moderator may always be the current speaker. Alternatively, a moderator may be an algorithmic implementation, which may be, for example, a FIFO queue, or a participant-voting scheme. The moderator may designate a maximum consecutively time for which a speaker may hold that designation.

The processor of a participant station, through the controls and display, provides a user interface (UI). Initially, the UI is used to select or establish a conference call.

Once a conference call is joined, the UI provides a means for a participant to monitor the status of the conference call. For example, the UI can indicate the identity (or pseudonym) of current and recently past speakers, and allow the participant to indicate a reaction to those speakers. The UI may provide a display of all participants in the conference call.

Further, the UI provides a mechanism by which a participant can request to become the speaker.

If the participant is the moderator, the UI provides a mechanism for the selection of the next speaker.

An additional function provided to a participant is the ability to select other participants with whom to communicate via a back channel. Such a back channel might be implemented as a whisper function, whereby the back channel communication carries the participant's voice. Alternatively, the back channel may be implemented as text messages, such as a page, or instant messages. Back channel communications may be, but are not necessarily limited to present participants of a conference call. For instance, such a back channel may be used by a participant to invite someone to join an ongoing conference call.

It is the object of this invention to the speaker in a conference call to be clearly heard by all other participants.

It is a related object of this invention to allow the participants other than the speaker to make comments and be heard by other participants, including the speaker.

It is an object of this invention to allow the designation of speaker to be passed under the control of a moderator, where the moderator is one of the participants in the conference call, or is implemented in software. In particular, it is an object of the invention to limit the time each speaker is permitted to speak, and to display that limitation to the speaker and potential successors.

It is an object of this invention to limit the exposure of participants to others who have previously been designated as offensive. Conversely, it is a further object of this invention to increase the opportunity of exposure to participants previously designated with a positive reaction.

In addition to the above, it is an object of this invention to permit the reaction of one participant or the combined reactions of multiple participants (perhaps over multiple conference calls) to escalate, if necessary to provide traceability sufficient to engage the force of law, in order to enforce civility.

It is a related object of this invention to provide participants with management of their own privacy by maintaining for each participant an alias having at least one generally available public part and a selectably revealed private part. It is a further object to provide more than one public part, which is selected manually or automatically according to context.

It is a related object of this invention to provide a mechanism by which a participant's voice may be disguised, and to allow a participant to drop the disguise for selected other participants.

It is an object of this invention to make it easy to invite participants to join an upcoming or ongoing conference call. It is a further object to let invited participants to invite additional participants. Still further, it is an object to invite participants, but to limit their capabilities (e.g. listen only, disallow forwarding the invitation, speak for shorter times, etc.)

It is another object of this invention to provide easy-to-use back channels of communication, which do not interrupt the conference call. These include voice (e.g. whisper), text messages (e.g. paging, instant messaging), and modifications to alias data (e.g. selecting facial expressions represented by data in the public or private parts).

It is an object of this invention to emulate the communication format provided by CB channels. It is a further object of this invention to allow a participant to monitor one or more conference calls, even when participating in a particular conference call.

It is an object of this invention to allow a conference call to be limited to participants having geographic proximity to some location, either fixed (e.g. a stadium, or shopping center) or calculated (e.g. the locus of participants' locations).

It is another object of this invention to provide topic-based conference call programs that may be either ongoing, for a pre-scheduled time slot. It is a further object that such programs may be promoted (i.e. sponsored) or open only to subscribing participants. It is also an object of this invention that such programs may be ad hoc, for a spontaneously created topic.

These and other features and advantages of the invention will be more readily apparent upon reading the following description of a preferred exemplified embodiment of the invention and upon reference to the accompanying drawings.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
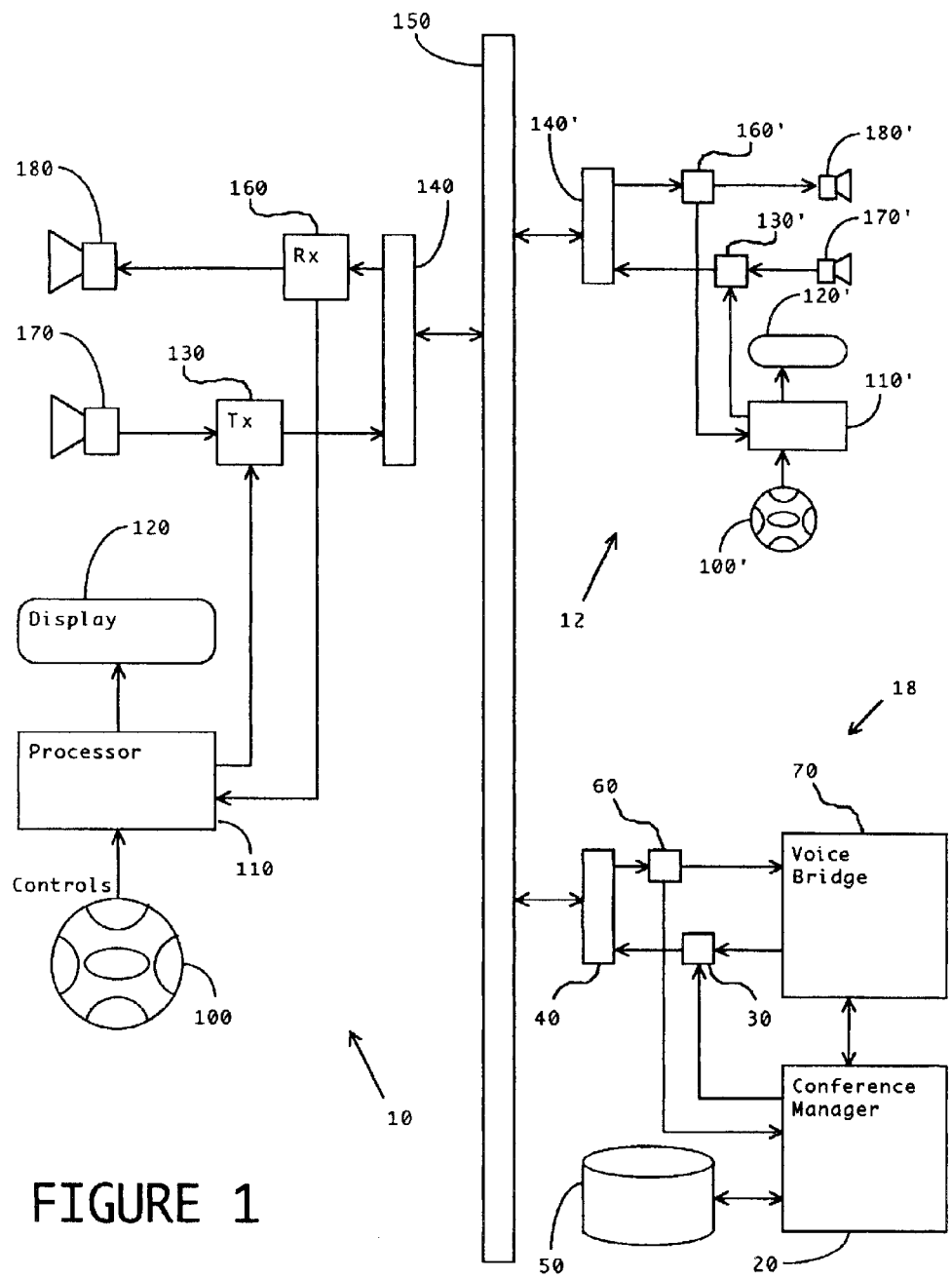
FIG. 1 is a detailed block diagram of the preferred embodiment having multiple participant stations configured to conference over a communications channel, and including the conference management system and voice bridge of the present invention.

Referring to FIG. 1, a plurality of participant stations is represented by stations 10 and 12, which are interconnected by the communication channel 150.

Note that while the term "participant" is used throughout, what is meant is simply the user of the invention, though most typically it may be that the user is a human, it is also possible that one or more participants could be a prerecorded or interactive program (not shown), designed to stimulate the conversation or to hold open an otherwise low- or zero-populated conference call.

For most implementations, and in the preferred embodiment, a conference server 18 is used. Each participant station 10, 12 communicates over communication channel 150 directly with conference server 18. The conference server is responsible for forwarding all pertinent communications, voice and data, from any of the participant stations to each of the others.

Communications channel 150 may be a telephone network, a local or wide area Ethernet, the Internet, or any other communications medium, or combination thereof. It is required, however, that both voice and data be carried. Thus, if communications channel 150 is the Internet, data could be carried using UDP or TCP datagrams, and voice could be carried over a voice over IP (VOIP) protocol. Of course, other protocols familiar or developed by to those skilled in the art can used substituted.

Alternatively, separate voice and data channels comprise communications channel 150. For example, voice can be carried over a switched telephone network, and data can be carried over a broadband network connection.

Many solutions to this data-plus-voice communications channel requirement are known, including, for example, modems compliant with the International Telecommunications Union V.70 specification, which can simultaneously carry both data and digitally encoded voice signals over a single dial-up phone line. Wireless solutions to the simultaneous voice and data problem are taught by Hillman et al., in U.S. Pat. No. 6,140,956, which provides for data to simultaneously and unobtrusively be sent over a wireless channel normally used for voice communication only. Software APIs, such as the DirectPlay and DirectVoice elements of DirectX 8.1 by Microsoft Corporation of Redmond, Wash. permit channels normally configured for data only to incorporate simultaneous digitized voice transmissions.

The plurality of participant stations 10, 12 are preferably implemented as cellular telephones. As is well known in the art, a cellular telephone has as voice input 170 a microphone, which is prepared and conditioned for transmission by transmit buffer 130, and sent via the communications channel interface 140, to the communications channel 150, in this case the cellular network. Signals intended for the participant station 10 are received across communications channel 150 and are detected and selected by communications channel interface 140, and provided to receive buffer 160. For those signals that represent voice, receive buffer 160 routes the signal to audio output 180, the cellular telephone earpiece.

In the preferred cellular phone implementation, controls 100 may be the telephone keypad, but is preferably a joypad and select buttons, a touchscreen, or other efficient and ergonomic input device. The display 120 is preferably a graphics enabled screen capable of resolution sufficient for an efficient and ergonomic user interface. A pure text or voice controlled interface, while not preferred, can also be used. Processor 110 displays the user interface on display 120, and accepts input from the controls 100. The minimum duties of processor 110 are to interpret the participant's inputs from controls 100 as commands which are relayed via a transmit buffer 130 to the conference server 18; and to present on display 120 the status information returned by conference server 18 which is received by processor 100 via receive buffer 160.

Alternatively, participant stations 10, 12 may be implemented as an application running on a computer workstation, for example running a Windows XP operating system by Microsoft Corporation. In such an implementation, the workstation would be provided with a microphone input 170 and audio output 180. The keyboard and preferably a mouse would comprise controls 100, and the workstation monitor would comprise display 120. An application running on the workstation would perform the function of processor 110. Transmit buffer 130, and receive buffer 160 can be implemented as a DirectPlay peer with an attached DirectVoice client. As such, interface hardware; whether a network interface card (NIC), broadband cable or DSL modem, or telephone modem, and the appropriate Directx drivers would comprise the communications channel interface 140. The communication channel 150 can thus be a LAN, telephone service network, or the Internet.

In still another embodiment, participant stations 10, 12 can be implemented as an ordinary telephone used in conjunction and proximity to a computer workstation running an application to function as processor 110. In such a hybrid implementation, communication channel 150 is comprised of two parts: the telephone network to which the ordinary telephone is connected, and a data network to which the computer workstation is connected. In the hybrid implementation, voice input 170 is implemented by the microphone of the telephone; the audio output 180 is implemented by the telephone earpiece. The telephone and computer workstation each have distinct transmit buffers 130, receive buffers 150, communications channel interfaces 140, and, likely, separate communications channels 150. Note that, for purposes of illustration, only a single transmit buffer 130, communication channel interface 140, communication channel 150, and receive buffer 160 are shown. In such an implementation, the computer workstation is preferably aware of the telephone number for the associated telephone.

Alternatively, the telephone must be dialed into a prescribed number.

A variety of implementations will become apparent to those skilled in the art, especially when considering the simultaneous voice and data modems, and simultaneous voice and data communication on a cellular telephone discussed earlier. Further, it is apparent that a cellular telephone embodying separate voice and data communications channels would function in a manner analogous to the telephone and workstation implementation discussed above.

Further, it is allowable that the plurality of participant stations 10, 12 be heterogeneous, that is, some of the plurality of participant stations may be implemented as cellular phones, while other are computer workstations, etc. The variety is managed by the conference server 18, which may increase in complexity in order to accommodate a larger variety of communication channels 150 and potentially differing capabilities of heterogeneous participant stations 10, 12.

In all embodiments, homogenous or heterogeneous, elements 100, 110, 120, 130, 140, 160, 170, and 180 of participation station 10, correspond to analogous elements 100', 110', 120', 130', 140', 160', 170', and 180' of participation station 12, respectively.

Conference server 18 connects to communication channel 150 via communication channel interface 40. Voice communications received through communication channel interface 40 by receive buffer 60 are sent to voice bridge 70, while data communications are sent to conference manager 20. Conference manager 20 controls voice bridge 70, and voice bridge 20 mixes the voice communications received from receive buffer 60 and sends the result to transmit buffer 30, all as described below. The conference manager 20 accepts and processes commands from the participant stations 10, 12 via receive buffer 60, and sends back data indicating the status of the conference call via transmit buffer 30. Data and voice received at receive buffer 60 is identifiably related to the one of the plurality of participant stations 10, 12 from which it originated. Similarly, data and voice signals, sent by the conference manager 20 and voice bridge 70 respectively, to the transmit buffer 30 are designated and directed to specific ones of the plurality of participant stations 10, 12.

The communication channel interface 40, transmit buffer 30, and receive buffer 60 of communication server 18 can have many implementations. As with analogous components in the participant stations 10, 12, these elements may connect to a single communication channel 150, or may connect to separate voice and data communications channels 150. Only one instance of elements 30, 40, and 60 is shown for simplicity, whether elements 30, 40, and 60 share a common communication channel for voice and data; whether there is a separate set of elements 30, 40 and 60 for voice and a separate set of elements 30, 40, and 60 for data; or whether there are separate sets of elements 30, 40, and 60 for each of a plurality of communications channels 150 required to allow heterogeneous implementations of participant stations 10, 12 to inter-operate.

As previously mentioned, voice signals received at receive buffer 60 and passed to voice bridge 70 are identifiable as to the originating one of participant stations 10, 12. Similarly, the mixed voice signals provided by voice bridge 70 to transmit buffer 30 are identifiably addressed to the respective destination participant stations 10, 12. Importantly, a corresponding identifiability applies for the data moving to and from buffers 30 and 60 from conference manager 20 with the reason made clear when examining FIG. 2.

In the course of managing a conference call, conference manager 20 makes use of database 50 (described in detail in conjunction with FIG. 5) to create, access, and update information about participants and conference calls.

Figure 2:
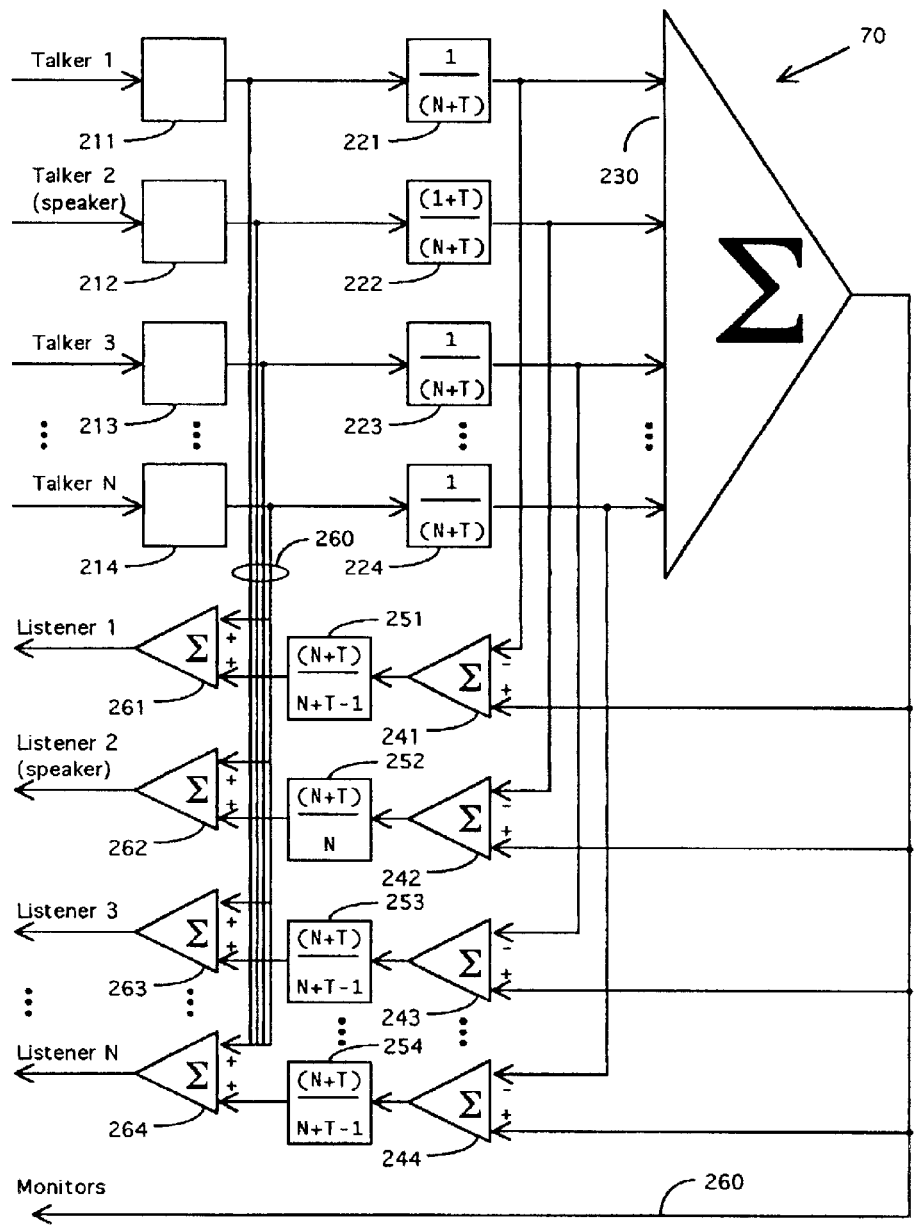
FIG. 2 is a schematic of the preferred embodiment of a voice bridge of the present invention.

FIG. 2 shows the preferred signal processing logic comprising voice bridge 70. Voice signals from receive buffer 60 (not shown in FIG. 2) arrive as distinctly identified signals Talker 1 through Talker N. These identified signals each correspond to a different one of the plurality of participant stations 10, 12. Here, N would be the number of participant stations 10, 12 actively connected in a conference call.

As taught in the prior art, incoming voice signals range in amplitude, noise content, and activity and require some conditioning before voice signals are combined in a conference bridge. Signal processing blocks 211–214 provide such conditioning. Each of signal processing blocks 211–214 processes input signals Talker 1–Talker N respectively to provide the functions of noise gate (to eliminate low noise levels during intervals of silence), automatic gain control (to raise the voice level of a quiet speaker or a participant station having a low gain voice input 170).

Signal processing blocks 211–214 preferably detect continuous or frequent high levels of audio content and generate a signal (not shown) to alert the conference manager 20. Thus, the conference manager 20 can detect cases where such a signal would be disruptive (e.g. the participant station producing such signals is not currently designated as the speaker) and take an appropriate action such as: directing the corresponding signal processing block 211–214 to attenuate the incoming signal; warning the corresponding participant of the disruptive nature of his signal via a message to the corresponding processor 110 to be shown on corresponding display 120; relegating the corresponding participant station to a listen-only role; dropping the corresponding participant station from the conference call altogether; or other suitable action.

In cases where the privacy of the participant connected through a signal processing block 211–214 is to be enhanced by a voice disguise, the disguise is preferably imposed by the same signal processing block 211–214.

After processing, the resulting voice signals, disguised or not, should end up with roughly similar amplitudes, other than when silenced by the noise gate function.

Subsequently, each processed voice signal coming from signal processing blocks 211–214 is scaled by pre-mix gain controls 221–224, respectively. These pre-mix gain controls 221–224 are set by the conference manager 20 through a control connection (not shown). In this way, the conference manager 20 can assign a specific one of participant stations 10, 12 the designation of speaker, represented as a logical token. For a conference call having N participants, a preferred algorithm is to assign the token a value of T (where T>=0). The conference manager 20 sets the pre-mix gain controls 221–224 corresponding to participant stations not having the speaker token to $1/(N+T)$, and sets the remaining pre-mix gain control 221–224 which does correspond to the participant station having the speaker token to $(1+T)/(N+T)$. In doing this, the participant at the station having the speaker token is more easily and clearly heard than other participants so long as that participant station holds the designation of speaker.

Note that other scale functions can be implemented by pre-mix gain controls 221–224, and be controlled by conference manager 20. The preferred embodiment presumes that the scaling and subsequent mixing takes place in linear space, as opposed to a non-linear signal encoding such as Mu-Law or A-Law. However, alternative embodiments may employ other scaling algorithms, which may be non-linear (e.g. logarithmic or exponential). However, for the preferred embodiment, the value of T can be chosen to provide great flexibility. If T similar to N, or larger, this will make the speaker voice vastly dominant. If T is small with respect to N, the voice of the designated speaker is given only a slight advantage. If T=zero, the voice of the designated speaker is given no advantage over other voices.

Mixer 230 sums together the resulting processed and scaled voice signals provided by pre-mix gain controls 221–224.

The summation voice signal resulting from mixer 230 can be directed back to each participant station 10, 12, including any who may be designated as lurkers. However, it is preferable that the voice signal obtained from a particular participant station 10, 12 is not returned to that same station in the resulting sum. For this reason, the summation voice signal resulting from mixer 230 is provided to subtractors 241-244. The processed and scaled voice signal provided by each of pre-mix gain controls 221–224 is provided to corresponding subtractors 241–244. The resulting difference voice signal from the subtractors 241–244 represents the summation voice signal for all participant stations other that the corresponding participant station (i.e. each subtractor produces the aggregate sound of everyone else's voice).

It is additionally desirable for a post-mix gain control 251–254 to boost the signal a bit to compensate for the subtracted voice signal. As before, the scale factors produced by each of post-mix gain controls 251–254 comes from the conference manager 20 via connection (not shown). For post-mix gain controls 251–254 corresponding to participation stations not designated as speaker, the scale factor is (N+T)/(N+T−1). For the remaining post-mix gain control 251–254 which corresponds to the participation station that is designated as the speaker, the scale factor is (N+T)/N. As with the scaling factors for pre-mix gain controls 221–224, the many algorithms can be used for setting the scale factors. Further, the function of the post-mix gain controls 251–254 is only a serious matter for the signal corresponding to the participant station designated as the speaker, and then only when T is more than small relative to N. This is because the loss in signal amplitude caused by the subtraction of the participant's voice only matters greatly when that participant is the speaker, and then only when the speaker's voice has been given a significant advantage over the other participants.

For a participant station 10, 12 whose designation is only to monitor a conference call, and therefor have no voice input and thus no corresponding signal processing blocks 211–214, nor pre-mix gain control 221–224, this is also no need for a corresponding subtractor 241–244, nor post-mix gain control 251–254. Such monitoring stations can receive the mixed voice signal 260 generated by mixer 230 without a requirement for further processing.

The preferred implementation will also have an audio whisper capability available. This can be achieved with the addition of whisper bus 260 and whisper mixers 261–264. If a participant, preferably not the one designated as speaker, elects to whisper to another participant, the whisper target, then the conference manager 20 performs several actions: First, conference manager 20 sets the premix gain for the whispering participant to zero; Second, conference manager 20 reduces the post-mix gain 251–254 corresponding to the whisper target, for example to ¼ of the previous setting, thus lowing the overall level of the conference call; Third, conference manager 20 directs the whisper mixer 216–264 corresponding to the whisper target to select the single line of the whisper bus 260 corresponding to the whispering participant. Finally, the audio sent to the whisper target is generated in the corresponding whisper mixer 261–264 by taking the normalized audio from the signal processing block 211–214 corresponding to the whispering participant and adding it to the attenuated mixed audio from the post-mix gain 251–254 corresponding to the whisper target. If necessary, the audio signal processing block 211–214 corresponding to the whispering participant can be directed to attenuate the otherwise normalized voice output, for example to ¾ of the normalized setting. The remaining coefficients of premix gains 221–224 and post-mix gains 251–254 are not recalculated as a result of mixing, as this would result in seemingly random fluctuations in volume.

It should be apparent to those skilled in the art that the overall audio signal processing performed in voice bridge 70 under the control of conference manager 20 may be dramatically modified and can be achieved using analog electronics, dedicated digital signal processing (DSP) equipment, or even an appropriately programmed general purpose microprocessor. As an example of the latter, the functionality of voice bridge 70 could be achieved using the APIs of Microsoft Corporation's DirectX 8.1, using primarily the DirectAudio and DirectVoice interfaces. In fact, with the exception of the novel features of the present invention, such an implementation is the basis for the mixing server in a DVSESSIONTYPE_MIXING type of Directvoice voice session.

Figure 3:
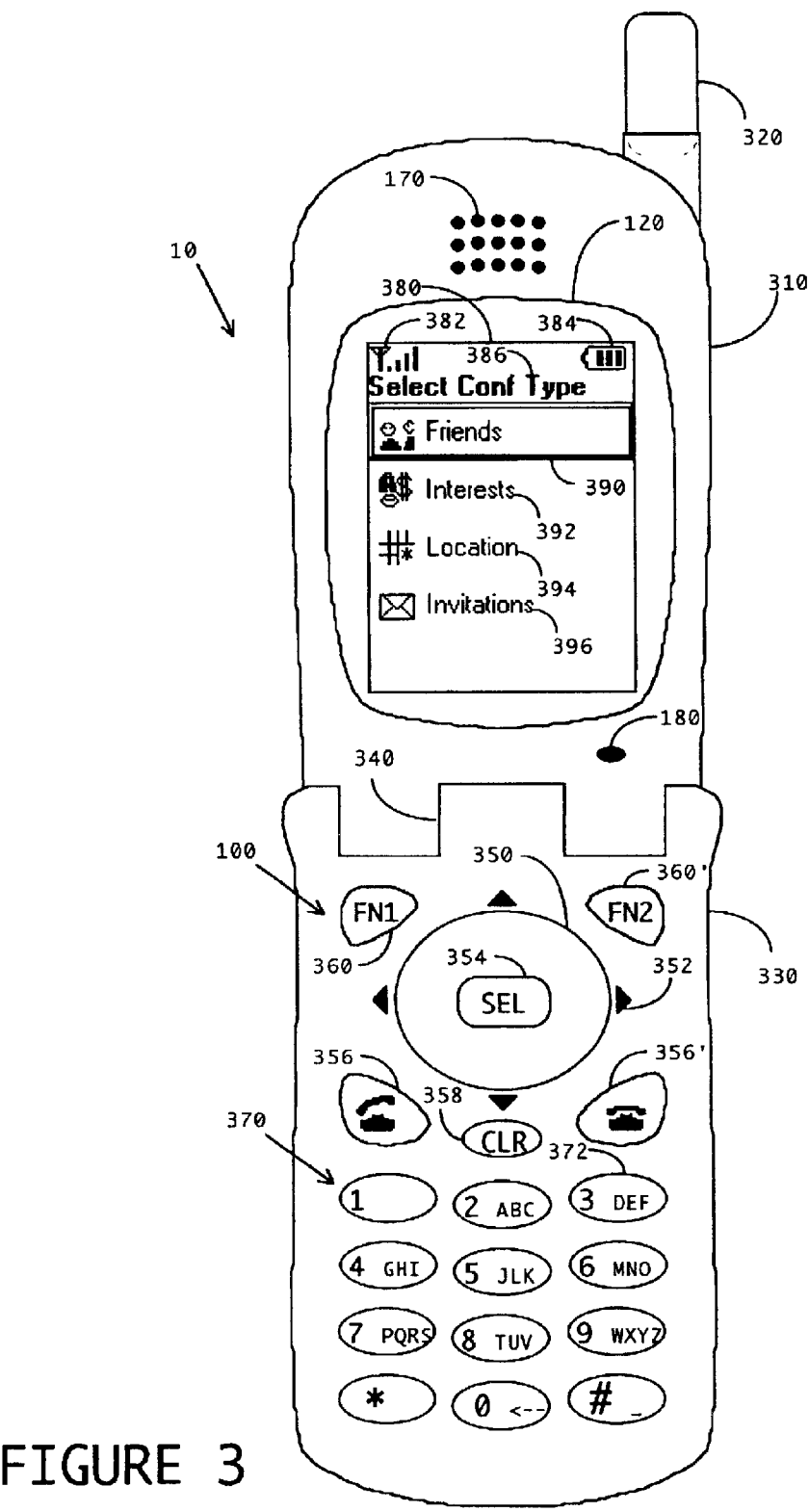
FIG. 3 shows a cellular phone of the prior art implementing the preferred embodiment of a user interface for a participant's selection of a conference call according to the present invention.

Referring to FIG. 3, the preferred cellular telephone based embodiment of participant station 10 is shown in detail. As previously mentioned, equivalent functionality can be implemented on a personal computer with either internal audio functionality, or in conjunction with a separate telephone.

FIG. 3 is based upon a cellular telephone of the well-known "flip" type, though this type of cellular telephone is not a requirement. The cellular phone body is comprised of display section 310, housing display 120, audio output earpiece 170, voice input microphone 180, and from which protrudes antenna 320. Touchpad section 330 houses controls 100, and is mechanically connected to the display section by hinge 340.

Display 120 contains the Select Conference Type dialog 380, showing the preferred initial user interface (UI) for joining or initiating a conference call.

Indicators 382 and 384 provide information pertinent specifically to a cellular telephone, that is wireless signal strength and battery charge remaining, respectively.

Preferably, menu title 386 appears after the participant has indicated that a conference call was desired. Menu title 386 marks the first level of a hierarchical conference call selection menu. Menu title 386 requests the participant to select the type of conference call desired. In this example, menu items 390, 392, 394, and 396 offer a selection of conference calls based upon other participants designated as friends, other participants sharing a common interest, or other participants having proximity or relationship to some location, respectively. The details of joining a selected conference call or creating a new conference call are discussed below, in conjunction with FIG. 5.

In FIG. 3, the current state is that menu item 390 is currently selected, as shown by the highlighting box surrounding it. At this point, the controls 100, when manipulated by the participant, interact with display 120 through processor 110 to form an intuitive user interface. In the current situation, joypad 350 is used to alter the selection. Consecutive presses of joypad 350 in the direction of the downward one of the four directional indicia 352 would result in the selection of menu items 390, 392, 394 and 396 moving sequentially downward. Consecutive presses of joypad 350 in the direction of the upward one of directional indicia 352 would result in the selection of menu items 396, 394, 392, and 390 moving sequentially upward.

Upon the desired menu item being selected, the participant's choice is indicated by pressing select button 354.

If the participant wishes to abandon that selection, the clear button 358 can rescind that choice. If the clear button 358 is pressed either before making a menu choice or after having rescinded a menu choice, then the participant exits the entire conference call selection interface.

Subsequent levels (not shown, but discussed in conjunction with FIG. 5) in the hierarchical conference call selection menu become even more specific and eventually lead to the identification of a particular conference call to be joined or initiated.

With a specific in-progress conference call indicated through the hierarchical menu, the participant can either use select key 354 to monitor the conference (and not be able to speak), or use pick-up button 356 to join the conference call. Alternatively, an additional dialog could be generated which asks whether the participant wishes to join or merely to monitor the indicated conference call.

Figure 5:
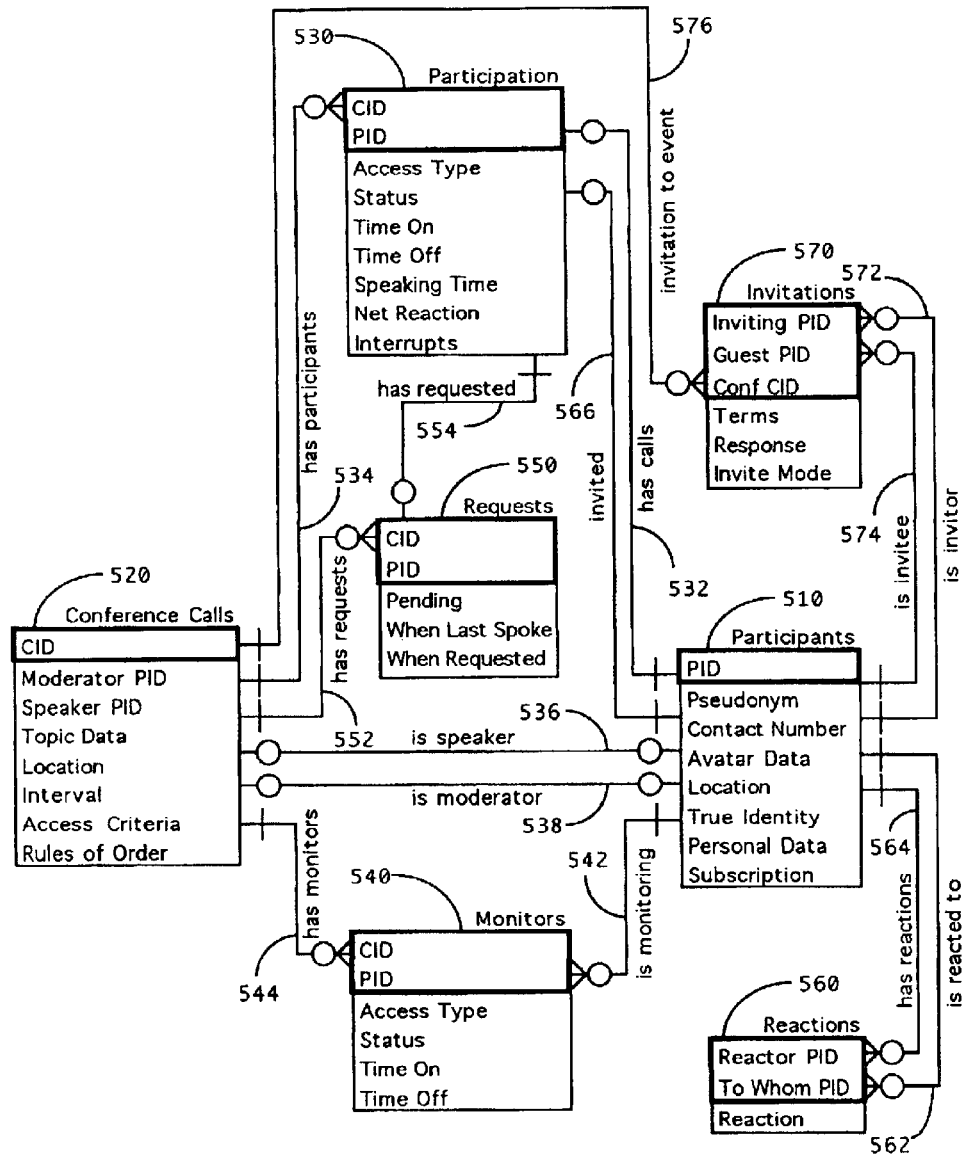

The process of initiating a conference call is described in more detail in conjunction with FIG. 5.

It will be readily understood by those skilled in the art, that a wide variety of mechanisms for selecting a conference call to join or initiate can be designed. For instance, in a computer game having multiple players, a simple button may be provided to allow the participant to join a conference call comprised of other participants currently engaged in the same game. In that example, the selection can be even more restrictive: if the game comprises a virtual world, then the conference call can be restricted to participants in the same virtual geographic region. Further, the conference call might be limited to participants playing on the same team, or having game-mediated skills or talents that enable the communication (e.g. only telepaths are allowed to conference call, or only wizards possessing a "Far Hearing" spell can participate.

In an alternative embodiment, wherein display 120 is provided through a speech interface, an interactive voice response (IVR) system may prompt the participant with the spoken phrase "What Conference Type?" The participant could respond "Friends," and a voice recognition function would make the menu selection. Note that the voice recognition function may be performed either in processor 110 or by a remote speech interpretation system (not shown). Such IVR techniques are well known in the art and many implementations are readily available, both on local and remote processors. The nature of display 120, whether graphic or audio, and the locus of computation to determine the participant's selection, whether local or remote, does not alter the fundamental operation of the present invention.

Figure 4:
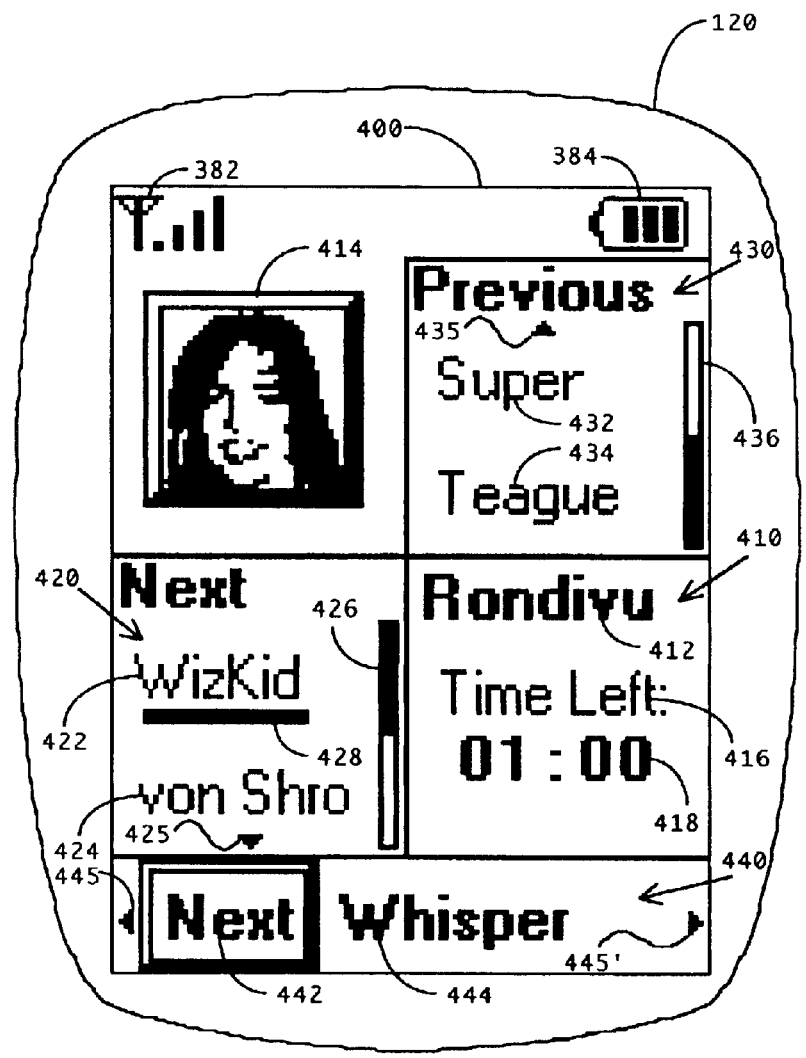
FIG. 4 depicts the preferred embodiment of a user interface supplied to a participant while a conference call is in progress; and, FIG. 5 is a representation of the preferred embodiment of data and relationships tracked by the conference management system.

FIG. 4 shows the ongoing conference call user interface 400 on display 120, as it would appear in the preferred cellular telephone implementation of participant station 10.

Present speaker data 410 preferably includes the speaker name 412, which may be a pseudonym, for the participant currently designated as speaker. In addition, an image 414 of the participant currently designated as speaker can be displayed. Image 414 could be a live video transmission, a still image, a computer graphic rendering of a 2D or 3D avatar for the participant, artwork, icons, or the text "image not available." Image 414 and speaker name 412 may be derived from the public part or private part of the data associated with the speaking participant and stored in database 50, depending upon whether the participant operating the local participant station has been granted any access to the private part. Further, the data from which is derived image 414 and speaker name 412 may be determined by context. For example, when the conference call in progress has as its topic a particular role playing game, and all participants have characters in that game, then speaker name 412 and image data 414 would be representative of participants' characters in that game.

Next speaker list 420 preferably shows a list of participant names queued to receive the designation of speaker. The top name 422 on the list is the default to receive the designation of speaker. This is indicated by highlight 428. When the timer 418 for the presently designated speaker runs out, or the presently designated speaker yields that designation, the participant whose name is indicated by highlight 428 is designated as the speaker.

In the preferred implementation, a menu of participant actions 440 is presented. Contents of this menu will vary, depending upon the status of the participant station 10 (e.g., whether the participant station designated as speaker or moderator, or whether it is limited to listen-only). The currently menu item 442 is noted by a highlight box. The availability of unselected items too numerous to be shown on the display 120 is indicated by horizontal scroll indicia 445 and 445'. The currently menu item 442 can be selected by pressing select button 354. Alternatively, the leftmost menu item 442 and rightmost menu item 444 can be selected by soft function keys 360 and 360' respectively, whether or not the associated menu item is highlighted. Other menu items 444 and those not shown on screen can be viewed and highlighted by pressing the joypad 350 left or right.

The following paragraphs discuss items that are preferably listed in the actions menu 440, and their corresponding function:

"Next" 442 is preferably the default action when a participant is designated as speaker. In order to minimize delay in handing off the speaker designation, this is always a readily available selection for the participant designated as speaker. Upon selecting the "Next" action item 422, the designation of speaker is yielded by the participant station, and advanced to another participant station. Usually, the next speaker to be designated is the participant whose name 422 is at the top of the next speaker list 420. The next speaker name is highlighted by underscore 428. If the conference call rules allow, the default selection for next speaker can be overridden by selecting a different participant using the participant selection method described below. "Next" 442 is also available to the designated moderator if the conference management rules allow for the moderator to manually advance the designation of speaker. Further, if the conference management rules allow the speaker to be "booed off," the "Next" menu item 442 will be available to participants other than only the speaker and moderator. In this case, the speaker designation changes if a sufficient number of other participants have voted to go to the next designated speaker. This is reminiscent of the Chuck Barris game show production, "The Gong Show." When this occurs, the participant station newly designated as speaker is notified and that participant takes over the role of speaker.

The speaker designation is also rescinded if the designated participant station hangs up the phone connection by pressing button 356' (or closing a flip phone), or otherwise becomes disconnected, for example when the designated participant's cellular phone wireless signal is lost or the cellular phone battery becomes depleted.

"Request" (not shown in participant action menu 440) is the mechanism by which a participant not presently designated as speaker may request to become the designated speaker. Upon selecting "Request," the requesting participant's name or pseudonym is added to the next speaker list 420. The names of all participants having so requested 422, 424 appear in the list 420, unless there are too many to be displayed at once, in which case indicia 425 appears to indicate that more names can be examined and graph 426 appears to indicate what portion of the whole list is being displayed (here, the top half). Names that are too long for the width of the display, e.g. name 424, are truncated, but scroll to reveal their entirety when highlighted (e.g. "von Shro" scrolls to display the whole name "von Shroom").

"Whisper" 444 allows a participant not presently designated as the speaker to conduct back channel communication with one or more other designated participants. Selecting "Whisper" preferably brings up a messaging window (not shown) into which a message may be typed using the numeric keypad 370, or other techniques well known in the art. The message is addressed to another participant, which may have been previously designated or who is chosen from a list of current participants using the participant selection method, described below. Methods of transporting this text message to the addressee are well know and may take the form of a pager message, an "instant message," such as those offered by America Online or Microsoft. Alternatively, "Whisper" can send a voice message to one or more other participants. In such a case, the whispered message will momentarily dominate the mixed audio of the conference call received by the one or more other participants. The voice message whisper will make use of the whisper elements (i.e. whisper mixers 261–264 and whisper bus 260) of the voice bridge 70 under the control of the conference manager 20, as previously described.

"Invite" (not visible in participant action menu 440) operates in a manner similar to the text mode of "Whisper," insofar as bringing up a text-messaging window (not shown). However, the message is intended to invite someone not currently a participant in the present conference call. Pager messaging, or instant messaging, or email can each be used as a delivery channel for the invitation. Alternatively, a telephone call to the recipient may be placed. In such a case, the inviting participant's participation in the conference call is placed on hold while the inviting telephone call is placed. In a still different embodiment, the inviting participant could have a pre-recorded or computer generated telephone call be made to the invitee. The latter method can be achieved without the inviting participant leaving the context of the conference call. "Invite" is a legitimate activity for any participant, including, while not common, the current speaker (unless the invitation mode requires the participant to speak). An alternative UI (not shown) could display and allow editing of the list of issued invitations and any responses received. If necessary, according to the rules for the present conference call, the invitation includes a reference code so that when the invitee responds, the origin and permissions associated with the invitation are maintained. For example, the rules of the conference may be that invitees of the moderator may speak for a maximum of two consecutive minutes, however invitations extended by a non-moderator are limited to speaking for a single minute. Thus, a participant joining by responding to the invitation of a non-moderator can be assigned the correct one-minute consecutive speaking allotment. More convoluted still could be a rule allowing the preferred allotment of two minutes to invitees of the moderator and their direct invitees. However, the inferior one minute allotment would be assigned to invitees of the invitees of the invitees of the moderator, and those of further derived status. Exemplary implementation details of "Invite" are given in conjunction with FIG. 5.

"Complain" (not shown in participant action menu 440) allows a non-speaking participant to complain about the current speaker. Alternatively, after selecting "complain," the participant selection method described below can be used to complain about any recent speaker. The result is the logging of a complaint by the participant against the identified speaker, which can be subsequently investigated if warranted. Optionally, a text-editing window can be opened to permit a detailing of the complaint. Optionally, the complaint can be provided to the speaker about whom the complaint was issued.

"Reveal" (not shown in participant action menu 440) allows any participant to set permissions allowing another participant to receive or inspect participant data in database 50 comprising the granting participant's private part. Without having previously granted the other participant such privileges, the other participant is constrained to view only public part data about this participant. In the course of choosing the "Reveal" command, a participant must indicate to which other participant the private part data is being revealed, preferably by using the participant selection method described below. Further, the private part may consist of several elements, in which case a selection by the participant of which elements are being revealed will also be needed.

"Inspect" (not shown in participant action menu 440) allows a participant to examine whatever information is available to him about any participant. Upon selecting "Inspect" and identifying a participant using the participant selection process described below, a window containing public part data about the selected participant is opened (and if the querying participant's access permissions are sufficient, then private part data, too). If the "Inspect" command is issued to examine the querying participant's own data, the data may be editable. Such a command may be the only option initially available to a participant new to the service, as this may be the only way for the system to get public data, e.g. the public name (alias) for the participant. Preferably, however, a web-based interface is made available to allow a participant to access and edit his own data in participant database 50, using a browser.

"Reaction" (not shown in participant action menu 440) is the action selected when a participant wishes to record a personal reaction for or against another participant. Once the target participant is chosen, preferably using the participant selection method below, the reacting participant is minimally able to indicate a "thumbs down" reaction, indicating that the target participant is for some arbitrary reason, undesirable. Subsequently, conference calls available for selection by this participant but that already have the undesirable target participant as a member, with be demoted in a preference ranking, or even hidden (preferably, according to the participant's choice). Preferably, the reaction can be recorded on a higher resolution scale, including for example thumbs-up (a positive reaction), thumbs-down (a negative reaction), or neutral. Descriptive reactions are also possible, for example the target participant could be labeled with selections such as charming, witty, interesting, soft spoken, bossy, loud, disruptive, immature, boring, etc. Subsequently, ongoing conference calls under consideration by the participant might receive aggregated ratings of "witty-ness" or "boring-ness" based on the aggregation of the considering participant's reactions to those individuals already joined as participants.

"Who Invited You" (perhaps abbreviated as "WIY?" and not shown in participant action menu 440) indicates to the querying participant the origin of the invitation to any of the participants. This allows a participant to understand some of the social relationships and use that information to inform, for example, a subsequent "Reaction" action. The participant selection method described below is used to make the query, and the outcome of the query is preferably to highlight the participant who is the source of the invitation.

"Initiate" (not shown in participant action menu 440) is the action taken by a participant to create a new conference call. Optionally, this action is an automatic reaction to selecting a conference call from the hierarchical menu beginning with Select Conference Type dialog 380.

"Expression" (not shown in participant action menu 440) is the action taken by a participant to select an alternative image 414 or other avatar data to be seen by other participants when the participant is designated as speaker, or when whispering. If the alternative image 414 is obviously the same avatar, but laughing or angry, then this provides the ability to include facial expressions. Preferably, the invocation of "Expression" can induce at least the participant station of at least the designated speaker to show the selected alternative image. In this way, the speaker is able to receive feedback from the participant audience. Alternatively, the alternative image is seen by all participants. In another embodiment, the alternative image might be from the private part, and would therefor only be seen by those for whom the participant has previously "Revealed" private part data.

"Interrupt" (not shown in participant action menu 440) is the action taken by a participant to barge to the top of the next speaker list 420. Preferably, when selected, "Interrupt" immediately changes the designated participant to the participant using "Interrupt." At this point, the interrupting participant preferably has perhaps ten seconds to make a point, after which the designation is returned to the previously designated speaker. Preferably, a participant using "Interrupt" cannot in turn be interrupted. Further, once a participant has used "Interrupt," the action is preferably removed from the participant action menu 440 for the balance of the conference call. By making "Interrupt" into a scarce resource and limited in temporal effect, its use will be more cautiously employed and is less likely to be abused. Preferably, an exception to this is made for the participant designated as moderator; If the moderator is assigned to keep the conference call on a particular topic, then "Interrupt" becomes an important tool for refocusing the current speaker. Whether "Interrupt" is available to any participant, whether "Interrupt" acts immediately or comes at the end of the turn of currently designated participant 422, how many times a participant may use "Interrupt" in a conference call, how long the designation acquired by "Interrupt" may last, whether "Interrupt" removes a participant from the next speaker list 420, how multiple simultaneous uses of "Interrupt" by multiple participants are managed, and whether the moderator has unlimited interrupt capabilities are specified in the Rules of Order.

Frequently, an action selected from the participant action menu 440 requires a target participant. The current target participant is indicated by highlighting underscore 428. When the focus of the UI is in the action selection menu, as indicated by a highlighted command 442, a pressing of the select button 354, or anytime the left or right soft command buttons 360, 360' are pressed, the action command is executed. If the action command requires a target participant, the focus of the UI shifts to the current target participant (i.e. participant name 422 as indicated by underscore 428.) At this point, the command can be aborted by pressing the clear button 358. However, the target participant selection can be modified by using the joypad 350. For instance, pressing downward on joypad 350 would result in the underscore 428 dropping down to the next lower name 424. Subsequent downward presses would scroll to lower names on the list (not shown). Pressing the joypad 350 to the right would place the underscore beneath the current speaker's name 412. An upward tilt of the joypad 350 would highlight the bottom name 434 of the previous speakers list 430. At any point in this process, the name highlighted by underscore 428 is the current target participant selection, and pressing select button 354 will result in the action previously selected being executed using the current target participant selection. Note that some actions, e.g. "Complain" may only allow the current or previous speakers as targets. In this and similar cases, only appropriate targets could be selected. Alternatively, a separate key (perhaps one designated from among the numeric keypad 370) could summon a list of all suitable participants, perhaps arranged in alphabetical order. Another alternative would be to use the numeric keypad 370 to summon a list of participants beginning with a particular letter. Thus, two presses of the "3 DEF" 372 key would result in a list of all participants who's displayed name begins with "E."

Note that during selection of actions from menu 440 and selection of target participants, the participant can still be engaged in the conference call. All the audio is still heard, and, when permissible, the participant's voice still contributes to the conference call.

Preferably, the management rules for a conference call permits the moderator to override the default and select any participant who will be designated to speak next. Usually, the moderator is the current speaker, though this is a selectable management rule.

When the speaker designation is passed for whatever reason to the participant designated as the next speaker, the name of the current speaker 412 is moved to the bottom of the previous speaker list 430. The bottom name of the previous speaker list 434 is moved upward. Names on the previous speaker list for which there are no longer room, e.g. 432, scroll off the top of the previous speaker list 430. The newly incremented length of the previous speaker list is reflected in graph 436. The previous speaker optionally has a maximum length (e.g. 10 names). The oldest name on the list exceeding the maximum length is dropped. Note that the next designated speaker may have been selected from the previous speakers list 430. If, however, the next designated speaker was selected from the next speakers list 420, that name is removed from its position in the list 420, the list 420 is scrolled upward, if necessary to close the gap, and graph 426 is updated to reflect the new shorter length. The name of the next designated speaker takes the place last held by the outgoing speaker's name 412.

If the conference call is operating under a rule that limits the current speaker to a maximum speaking time, this is indicated by a label 416 and a time remaining counter 418. As time remaining counter 418 reaches zero, the designation of speaker passes to a subsequent participant.

In cases other than when the timer 418 is expiring, it is expected that a certain amount of custom will develop around the conference call based society. One element that may spontaneously develop is a polite announcement of the selection of the next speaker. As the current speaker is voluntarily yielding to another participant he has selected, the outgoing speaker may customarily say, "And with that, I pass to WizKid," or some similar statement. Optionally, the system accepts the outgoing speaker's "Next" command, but still allows enough time for such a closing phrase. In this way, the newly designated speaker has advance warning, however brief, that the spotlight is about to fall to him. Another alternative implementation is to have the conference manager 20 inject an announcement into mixer 70 that will be heard at all participant stations 10, 12, such as "WizKid, you have the floor." In still another embodiment, a separately designated moderator would be expected to make the transfer announcement. Note that no transition announcement is required. However, such an announcement will nicely address the pause that will naturally occur between the end of the previously designated participant's last statement and the newly designated participant's first utterance.

During this transitional time, the conference manager 20 recalculates the coefficients for pre-mix gains 221–224 and post-mix gains 251–254 and causes those gain elements to ramp to the new values.

If viewed before the conference call takes place, there will be no previous speaker list 430, nor current speaker 410. However, the initial, or "keynote" speaker may already be listed in next speaker list 420. Even before the conference call begins, participants may use "Request" to queue up for the designation of speaker. Other functions, for example "Whisper" may be available, at least in text messaging mode. During this time, the previous speakers list 430 can be replaced by an invitees list, and the timer 418 can be replaced by an indication of when the conference call is scheduled to start.

FIG. 5 shows a detailed diagram of database 50 and identifies the important relationships therein. Database 50 contains information about participants, ongoing and upcoming conference calls, relationships between participants, and the participation of participants in conference calls. Specific columns in the data tables and many of the relationships are used to implement the new features of the present invention. Throughout the following discussion, table and column names are capitalized for clarity. For each of the tables 510, 520, 530, 540, 550, 560, and 570 in FIG. 5, the key fields are contained in a highlighted box at the top of the respective table. PID and CID are the native keys for Participants table 510 and Conference Calls table 520, respectively. All other occurrences of PID and CID are foreign keys in their respective tables 530, 540, 550, 560, and 570.

Every participant, currently online and engaged in a conference call or not, is represented in Participants table 510.

A newly created participant is issued a unique Participant Identifier, referred to as the PID, which may be used as the key to the Participants table 510. Each entry in Participants table 510 includes the participant's Pseudonym (or user name), which is preferably unique. Depending upon the implementation, a Password (not shown) may be stored to verify identity—and using the Password to verify identity can resolve otherwise ambiguous Pseudonyms.

Preferably, however, the system stores a Contact Number which can correspond to, for example, the participant's cellular telephone number, a serial number embedded in processor 110, or to a unique serial or registration number embedded in conference call application software executed by processor 110. Alternatively, permanently assigned IP addresses or Ethernet hardware addresses could be used. If a system allows a mixture of Contact Number types, an additional field specifying the type is added. E.g. if the Contact Number is a cellular telephone number, the Contact Number Type (not shown) specifies that.

Preferably, the device or software which is the source for the Contact Number is used only by a single individual, and thus the Contact Number, which can be readily and automatically obtained at runtime can be used to find the participant's record in Participants table 510. Alternatively, if this is not the case, a Password (described above), or other technique can be used to resolve the ambiguity. Another alternative would be to simply ask the participant which of the Pseudonym is appropriate.

An alternative embodiment may allow a single PID to be associated with multiple Contact Numbers, each potentially with its associated Contact Number Type. In such an implementation, the Contact Number & Contact Number Type values associated with each PID would be listed in a separate table (not shown), to better manage multiple entries. This would be appropriate if a single participant frequently made use of more than one participant station. For instance, a participant may use a cellular telephone while commuting, but a desktop computer implementation when at the office. In each case, the participant is usually identifiable by the participant station in use.

Preferably, the implementation allows for Avatar Data, such as image 414. Such information is optional, but may be provided by a digital camera or graphics program. Cellular telephones having built-in digital cameras are becoming available, such as the Nokia 7650 by Nokia Mobile Phones, Espoo, Finland. An image capture by a cellular telephone is a convenient way to generate Avatar Data suitable for use as image 414.

It may be the case, however that a participant's true picture is secured in the private part of the Participants table 510. As such, it may comprise a component of Personal Data (described below), instead. In this case, the Avatar Data may be left empty or filled with another image or drawing. Typically, the image of a participant's character in a role-playing game would be a good choice for Avatar Data.

Alternatively, a participant may have multiple instances of Avatar Data. Each instance might be associated with an Avatar Context (not shown). Thus, when engaged in a conference call associated with a particular role-playing game, the correct Avatar Data can be chosen. In such an implementation, a separate Avatars table (not shown) would be used, containing for each entry Avatar Data, Avatar Context, and the associated PID.

The Location field contains the current location of the participant, as well as can be determined. The Location field is preferably dynamic and is updated frequently. If the participant station in use is stationary, the street address will suffice for determining the location, by mechanisms well known. If the participant station is a cellular telephone, then either a GPS-based location or cellular antenna beam or other datum is used to derive the Location. The Location field may be considered as an element of the private part of participant data.

The participant's True Identity is maintained as one element of the private part of the Participant table 510.

Personal Data can include home or business address information, email address, instant messaging address, pager information, telephone number, fax number.

Some elements of Personal Data may be ever undisclosed to other participants. However, some elements, such as instant messaging or email address (among others), may be commonly disclosed to selected participants with the "Reveal" action.

The column Subscription records a participant's access agreement with provider of the conference call services. Some conference calls may be limited to participants having, among other things, a subscription of some type. The Subscription can be as simple as a boolean flag (e.g. SUBSCRIPTION=YES), or it may include many various access plans. This is especially suitable if a single conference call servicer 18 is providing services for multiple organizations. For example, the same conference call server 18 may provide free conference services for members who have registered on the "Mage Knight" fan club web site, and provide an hourly, paid-for service to members of a matchmaking service for singles. In the former case, the membership information from the web site is uploaded into database 50, where Subscription might read "MAGE_KNIGHT_SITE." In the latter case, Subscription might be "MATCHMAKERS_PLAN_B," assuming that there are multiple plans, such as Plan A, with 10 hours of pre-paid conference time and Plan B, with any number of hours paid monthly at an hourly rate.

Not shown in FIG. 5 are the data elements well known as necessary for measuring and billing usage. Such elements could be included in Participants table 510 as cumulative counts of usage, or would preferably be kept in a separate table (not shown) that relates back to Participants table 510. Also not shown is any financial information, such as credit card number, necessary for maintaining the participant's telephone (or cellular) phone account or conducting commerce over a conference call.

Conference Calls table 520 contains information about conference calls in progress.

Each conference call, when created, is given a unique Conference Identifier, referred to as the CID, which may be used as the key to the Conference Call table 520.

Initially, the participant creating the conference call is preferably designated as the moderator, and the creating participant's PID is stored in the Moderator PID. The Speaker PID is set similarly. This forms the initial relationships "is speaker" 536 and "is moderator" 538, which will usually change later or during the course of the conference call.

In order to further ready the conference call for additional participants, some additional information is gathered from the creating participant.

Preferably, the creating participant enters the Topic Data, which will be used by other participants to search for and identify this conference call. In the preferred embodiment, Topic Data is a title for the conference call. For example, "Master Planning Package Review" might be used for an architecture meeting, "Mage Knight Rulesi" might be used for a fan club meeting, or "Wicced's Raiders" might be a strategy session for a team in a gaming tournament.

By default, the Topic Data is listed as "ad hoc," to indicate that no Topic Data was entered. Such a course is appropriate if the creating participant intends to only allow invited participants who are expecting or will otherwise recognize the purpose for the conference call.

Alternatively, Topic Data may be augmented by a discrete selection from predefined list or hierarchical menu (not shown in FIG. 5). For example, hierarchically beneath the Select Conference Type menu 380, under menu item "Friends" 390, might come "Bowling Team," "PTA," and "Poker Night." Each of these selections would correspond to lists of participants (not shown) that the creating participant has already entered, or obtained as a result of participation in a prior conference call. Beneath menu item 392, might be a deep hierarchy of interests. For example, under "Entertainment" might come "Games," under which might be "Fantasy," under which might come "Miniatures," under which might come "Mage Knights Rebellion," under which the Topic Data title entered by the creator would be listed. Later, when a participant is searching or browsing for a conference call under menu item "Interests" 392, the "Mage Knight Rules?" conference would appear at the appropriate level in the hierarchy.

Such predefined hierarchies are familiar to users of www.eBay.com, the online auction web site by eBay, Inc. of San Jose, Calif., which lists auctions under predefined categories. Another useful aid in navigating such hierarchical menus is to have a number after each non-terminal entry in the hierarchy indicating how many ongoing conference calls exist under that entry. An example of hierarchies presented in this manner (though not related to conference calls) is the "Yahoo! Directory" at www.yahoo.com by Yahoo! Inc. of Sunnyvale, Calif. Both the eBay and Yahoo! Hierarchies are pre-established by the staff maintaining the web site.

An alternative approach would be the semi-pre-defined hierarchies that are used by the distributed Internet newsgroup service Usenet. Usenet allows users to create new entries to hierarchies (with some constraints), to which other users can then post news items. By allowing the user base to add new hierarchical entries, the categories to which items may be attached remains as dynamic as the society using the service demands. However, some may argue that the hodge podge of newsgroups detracts rather than enhances its usefulness. Further, because of the limited display capabilities of cellular telephone participant stations, relatively few entries should be available at a given hierarchical level—to minimize the difficulty of navigation; the hierarchy should emphasize depth, not width.

Preferably, the hierarchy under "Interests" 392 is not a strict hierarchy. For instance, one might reasonably expect to access conference calls regarding the game "Mage Knights" by starting with "Recreation">"Hobbies">"Collecting">"Miniatures and Figurines">"Wargame Miniatures">"Mage Knight". However, it would also be entirely reasonable to pursue a different route "Recreation">"Games">"Wargaming">"Miniatures Gaming">"Mage Knights." This is the way hierarchies are set up on the Yahoot web site, previously mentioned.

Alternatively, the hierarchical structure for defining conference call Topic Data can be searched on the title and preferably the hierarchical terms, in manners well known and widely used. That is, one could simply search for either or both "mage" and "knights", and the "Mage Knight" conference calls would be returned along with other conference calls whose titles or categories include those terms.

When a conference call is created in Conference Calls table 520, the Location of the creating participant from the Participants table 510 Location is transferred to the Location entry for the new conference call. Subsequently, the Location can be modified under various circumstances. Alternatively, the Topic Data might be associated with a physical site having a location of its own, e.g. Walt Disney World, Fla., the Hollywood Bowl, Calif., or Conference Room 7, XYZ Co. Corporate Headquarters. In such a case, the site location would become the Location associated with the new CID. Preferably, the Location can be optionally defined as the locus of current participants. Initially, this corresponds to the Location of the creating participant. As participants are added to the conference call, the locus of participants' Locations is recalculated. Optionally, the locus can be clamped to not exceed a specified distance from the moderator. Participants looking to join conference calls through the Select Conference Type menu 380 by choosing menu item "Location" 394 will find a hierarchy of conference calls having Access Criteria (discussed below) that limits participation to participants proximal, or otherwise related, to the conference call's associated Location.

Under menu item "Invitations" 396 are listed all of the conference calls to which the participant has received an invitation (discussed below).

A conference call having a Location and to which access is limited to participants whose own Location is sufficiently close by, is a mechanism by which a CB emulation can take place. Beneath the "Location" menu item 394, appears the selection "Channels." Under "Channels" can appear, for example, the numbers 1 through 40. For each channel that is currently being emulated in proximity to the querying participant's Location, the number of current participants to that call can be reported. Thus, the querying participant can see popular and unused channels merely by scrolling through the list. The participant counts can include those participants who are merely monitoring a channel, as well as those joined to it.

As the conference call is being created, the creating participant can specify an Interval. The Interval can be a scheduled time and estimated (or strict) duration to allow setting up future conference calls, or it can be immediate and have indefinite length. The Interval can also include information regarding recurrence to allow scheduling of regularly recurring conference calls, e.g. for a television show fan club having conference calls that occur each week following the broadcast of a new episode.

Associated with each conference call CID is Access Criteria, which determines the requirements for a participant joining the conference call. Access Criteria can relate to data in Participants table 510, such as Personal Data (e.g. is the Participant an adult, i.e. eighteen or older?), Location (e.g. is the Participant near the correct location, or, alternatively, is the participant in a city not yet represented by a participant), and Subscription (has the participant paid for the right to join). Access Criteria can relate to data in Reactions table 560, discussed below. Frequently, Access Criteria will include the constraint "by invitation only", which requires participants to have been invited through Invitations table 570, discussed below. When a participant is searching for a conference call to join, only those conference calls for which the participant meets the Access Criteria will be shown. Further, when a participant performs the "Invite" action on participant action menu 440, and the target participant specified fails to meet the Access Criteria, then the "Invite" action fails and the inviting participant receives notification, preferably including a reason (e.g., "Invitee does not meet Access Criteria requiring participants to be 18 or older.")

Alternatively, participants who meet a less stringent set if Access Criteria may be eligible for joining a conference call as a monitor (if monitoring is permitted at all). A participant monitoring a conference call can hear the mixed voice signal 260, but does not have an opportunity to speak.

Finally, the creating participant must specify the Rules of Order for the conference call. Rules of Order set the operational behavior that the conference call will initially follow. Optionally, the behaviors can be changed at a later time, including during the conference call itself. Some exemplary behaviors to be defined within the Rules of Order are listed here:

Does the current speaker has a limited time before the designation is rescinded, and if so, what is that limit?

How many speakers may be designated at a single time? (Practically, one, two, or three are reasonable, though some kinds of panels or other structured interactions or presentations may warrant larger speaker pools.)

What mechanisms are permitted for advancing the designation of speaker? Can the moderator designate the next speaker, or is the next speaker strictly a FIFO queue of participants having executed a "Request" action? Are interruptions allowed? How many?

Does the designation of speaker return to the participant designated as moderator before each the next speaker is designated?

Is the designation of moderator passed along with the designation of speaker?

Is there a limit to the number of participants, i.e. does the conference call fill-up?

What participation, other than listening, does a monitoring participant have, e.g., is the "React" action available, or can a "Whisper" action target a monitor for text messages?

Alternatively, there are likely to be a few most popular configurations for Rules of Order. The most common of these would be specified as the default. Other common settings may be selected, or custom settings may be entered, and even saved for future re-use.

Once a record in Conference Calls table 520 is completed, the designated moderator can begin issuing invitations (recorded in Invitations table 570, discussed below). If an invitation is not strictly required by the Access Criteria, participants searching for conference calls can find and join the conference call during the Interval stated in Conference Calls table 520. If the Access Criteria so allow, invitees and participants can, in turn, issue their own invitations to additional participants. Invitations received by a participant can be viewed by selecting menu item "Invitations" 396 on Select Conference Type menu 380.

As a conference call becomes active, that is, as the Interval recorded for it in Conference Calls table 520 becomes current, participants will begin to join. As a participant station 10 or 12 selects to join a specific conference call, the associated record from Participants table 510 is examined in conjunction with the appropriate record in Conference Call table 520. If the Access Criteria is met, a new record in Participation table 530 is created, and initialized with the correct PID and CID, forming a unique key. These fields also for the relationships "has calls" 532 and "has participants", respectively.

The record in Participation table 530 is initialized. The Access Type field contains the results of the analysis of a participant vs. the Access Criteria. Results might include how long or how many times the participant is allowed to speak, or how long the participant is allowed to remain on the conference call. The Time On field is initialized with the time at which the participant joined the conference call. This value has many uses. Time On can be used to determine whether certain rights have expired (e.g. if the participant is only entitled to 10 minutes of participation). Time On can be used for an algorithm that recognizes a "Request" from a participant on the basis of participant's seniority. Time On can also be used by a billing system. A related field, Time Off, is set when the participant quits the conference call.

A similar table, having analogous relationships and the fields described so far, is Monitors table 540 and the relationships "is monitoring" 542 and "has monitors" 544. In an alternative embodiment, records in Monitors table 540 could instead appear as records in Participation table 530, and have an Access Type indicating that the participant is a monitor. However, this can become inefficient when the number of monitors can be very large compared to the number of participants, as certain calculations and displays (e.g. target lists) are not concerned with monitors. For instance, if the conference call is comprised of a celebrity panel of ten, and a monitoring audience of thousands, the separation of tables 530 and 540 is warranted.

In addition, Participation table 530 has additional fields not contained in Monitors table 540. Most of these fields gain their value as the conference call progresses, though they can be initialized to zero, except for Interrupts, which is initialized according the the Rules of Order from the data in Conference Calls table 520. Speaking Time records the aggregate amount of time that the participant has spoken. This can be used, for instance, by nest speaker designation algorithms that favor lessor-heard voices over the more verbose. The Net Reaction field is used to aggregate the reaction (discussed below) of the other participants in this conference call to this participant. Net Reaction can also be used by a speaker selection algorithm. Interrupts notes how many operations of the "Interrupt" participant action remain to the participant during this conference call, and decrements with each use by the participant.

When a participant in a conference call exercises the "Request" action from participant action menu 440, the appropriate record is found, or generated if none exists, in Requests table 550. The CID and PID from the record in Participation table 530 is used to form the unique key of the new record. The CID and PID together form the relationship "has requested" 554, and the CID alone establishes the relationship "has requests" 522. Upon being created or subsequently found as the result of a "Request" action, the record field Pending is set to TRUE. If the record was just created or the Pending field was previously FALSE, then the When Requested field is set to the current time. The Requests table 550 records not only those participants who wish the designation of speaker, but also those who have been previously designated as speaker. Upon creation, the record field When Last Spoke is initialized to zero. Subsequently, whenever the participant is granted the designation of speaker in this conference call, Pending is set to FALSE and the When Last Spoke field is updated to the current time. In this manner, pending requests can be selected and sorted (if called for by the Rules of Order) by least recent designation as speaker. Alternatively, the field When Requested can be used to implement a strict FIFO queue, by giving priority to the participant having waited the longest since executing the "Request" action.

When a participant selects the "Reaction" menu item from participant action menu 440, and has selected a target participant, an appropriate record is found, or generated if none exists, in Reactions table 560. In Reactions table 560, the participant's PID and the PID of the target participant form the key for the record, and set up the relationships "has reactions" 564 and "is reacted to" 562, respectively. The participant's reaction to the target participant is recorded in the Reaction field, as described above in conjunction with the "Reaction" item of menu 440. A change in a participant's reaction to a target participant should induce the recalculation of a Net Reaction field in Participation table 530 associated with the target participant. Usually, this recalculation applies to a single record of Participation table 530 associated with the target participant and the one record in Conference Calls table 520 having as participants both the reacting participant and the target participant. The change may be broader if the relationship "has calls" 532 were altered to allow a participant to simultaneously participate in more than one conference call.

When a participant selects the "Invite" item from participant action menu 440 and has specified a target participant, a corresponding record is found, or is generated if none exists, in Invitations table 570. The PID of the inviting participant, the PID of the target participant (the invitee), and the CID of the conference call that is the subject of the invitation together form the key for the record. Further, they create the relationships "is invitor" 572, "is invitee" 574, and "invitation to event" 576, respectively.

In the field Terms, of Invitations table 570, is placed a derivation count used to determine the rights of an invitee, and future invitees of this invitee. As discussed above in conjunction with the "Invite" item of menu 440, it can be the case that a participant has the authority to invite others to join a conference call. Those invitees would receive an invitation having a derivation count in the Terms field that is one higher than the count for the inviting participant. When the derivation count exceeds a value in the corresponding conference call record field Access Criteria, invitees having that count have no ability to issue invitation. A subsequent change to the record in the Conference Call table 520 could alter this situation.

In the case where an invitation is created for a conference call having a recurring or continuous Interval, the invitation may also include single-use restriction or other limitation. Such information may form an additional aspect of the Terms field. For instance, a new software product might include an invitation having three uses of a 24×7 product support line conference call. Another use might be for a radio station promotion where lucky invitees can call in on any one of this week's interview shows to conference call with a celebrity.

An invitee participant's answer to an invitation, such as ACCEPTED, DECLINED, or MAYBE, is recorded in the Response field. Alternatively, the value INVITATION RECEIVED can be entered if the invitee is believed to have seen the invitation but not replied to it. Otherwise, the field's initial value is NO RESPONSE.

In some circumstances, an invitation can be issued for something other than full participation in a conference call. If this is the case, the field Invite Mode contains the restrictions. For instance, an invitation might be to join the conference call as a monitor, or perhaps as moderator or keynote speaker.

It will be a relatively common occurrence that a participant will be invited to join a conference call by more than one inviting participant. In this case, the separate invitations will bear the same Guest PID and Conf CID, but will have unique Inviting PIDs, as one would expect from the key fields. However, the invitation fields Terms and Invite Mode may have identical, similar, or entirely different values. In such a case, in accepting any of the invitations and joining the commonly identified conference call, the invitee is preferably granted the highest permissions and abilities of all of the invitations. However, if the invitee explicitly declines a particular invitation, then that invitation's Terms and Invite Mode are not considered for determining the highest permissions and abilities. Thus, for example, if invited by the moderator to be a co-moderator, and also invited by another participant to be a standard participant, accepting the invitation by the other participant would result in the designation of co-moderator, unless the moderator's invitation is explicitly declined.

The records in Invitations table 570 may be used to generate reminders as a conference call is about to begin. Further, invitations may also be used by the conference manager 20 to call participants having ACCEPTED recorded in the Response field.

While the preferred embodiment is discussed in the context of present day cellular telephones, computer workstations, traditional telephones, and current communications channels, it is contemplated that other modes of data display and input, voice interaction, and communications will become suitable as they are made available.

The particular implementations described, and the discussions regarding details, and the specifics of the figures included herein, are purely exemplary; these implementations and the examples of them, may be modified, rearranged and/or enhanced without departing from the principles of the present invention. In particular, the variety of examples for Access Criteria and Rules of Order just touch the surface of the capabilities which this invention makes possible.

The particular features of the user interface and the capabilities of the overall conference calling system, will depend on the architecture used to implement a system of the present invention, the operating system of the participant stations selected, the communications channel selected, and the software code written both for the participant stations 10 and 12 and the conference call server 18. It is not necessary to describe the details of such programming to permit a person of ordinary skill in the art to implement the application, user interface and services suitable for implementing a system within the scope of the present invention. The details of the software design and programming necessary to implement the principles of the present invention are readily understood from the description herein.

Various additional modifications of the described embodiments of the invention specifically illustrated and described herein will be apparent to those skilled in the art, particularly in light of the teachings of this invention. Further, it will be apparent that the functionality of this invention can be incorporated into and function from within the context of other products, such as computer games, consumer electronics, or office productivity software. It is intended that the invention cover all modifications and embodiments which fall within the spirit and scope of the invention. Thus, while preferred embodiments of the present invention have been disclosed, it will be appreciated that it is not limited thereto but may be otherwise embodied within the scope of the following claims.

We claim as our invention:

1. An improved conference call system having
    a plurality of stations each having a voice input, an audio output, and a user;
    a conference server able to support at least one conference call, and
    a communications channel connecting each station to the conference server; wherein
    the conference server selectably grants to each station access to a selected one of the at least one conference call,
    each station accessing the selected conference call sends to the conference server the respective voice input,
    the conference server sends to each station accessing the selected conference call a processed aggregation of the received voice input from the other stations accessing the selected conference call, and
    each station accessing the selected conference call sends the respective processed aggregation to the respective audio output;
    the improvement comprising:
        each station having a means to selectably send to the conference server a request for designation,
        the conference serve collecting the request for designation from each requesting station accessing the selected conference call, designating at least one requesting station accessing the selected conference call, and
        the processed aggregation for each non-designated station accessing the selected conference call having a greater portion of voice input from the at least one designated station.

2. The improved conference call system of claim 1, further comprising:
    the conference server designating a different requesting station at the end of a fixed period of time.

3. The improved conference call system of claim 1, further comprising:
    each station, when designated, having a means to selectably send to the conference server a request to yield designation, and
    the conference server, upon receiving the request to yield designation, designating a different requesting station.

4. The improved conference call system of claim 1, 2, or 3, further comprising:
    the requesting station designated by the conference server having least recently requested designation.

5. The improved conference call system of claim 2 or 3, further comprising:
    each station having a display,
    the conference server sending to at least the designated station of stations accessing the selected conference call requesting data representing at least one station requesting designation,
    the designated station presenting the requesting data on the display and having a means to selectably send next speaker data representing one of the requesting stations to the conference server,
    the conference server designating as the different requesting station the station represented by the next speaker data.

6. The improved conference call system of claim 5, further comprising:
    the conference server sending to each station accessing the selected conference call speaker data representing the at least one designated station,
    each station accessing the selected conference call maintaining a list of speaker data representing at least one previously designated station,
    the designated station presenting the list of speaker data on the display and having a means to selectably send next speaker data further able to represent one of the previously designated stations.

7. The improved conference call system of claim 1, further comprising:
    the conference server sending to each station accessing the selected conference call speaker data representing the at least one designated station, each station having a display and presenting the speaker data on the display.

8. The improved conference call system of claim 7, further comprising:
   each station accessing the selected conference call having a means to selectably enter rating data representing a reaction that is one of positive and negative concerning the at least one designated station.

9. The improved conference call system of claim 8, further comprising:
   each station accessing the selected conference call sending the rating data to the conference server,
   the conference server recording the rating data from the respective station, and
   upon recording at least one negative reaction to the at least one designated station, designating a different requesting station.

10. The improved conference call system of claim 8, further comprising:
    the conference server recording the rating data respective to the user of the rating station and user of the rated station,
    sending to a selecting station of the plurality of stations, a list of conference call data representing a subset of the at least one conference call,
    the subset excluding conference calls for which the user of at least one accessing station is associated with negative rating data entered by the user of the selecting station,
    and the selecting station displaying the list of conference call data on the display, and having a means to selectably send conference call selection data, designating the selected conference call.

11. The improved conference call system of claim 1, wherein
    each of a subset of the plurality of stations comprises a cellular telephone, and
    the communications channel is at least partially comprised of a cellular telephone network.

12. The improved conference call system of claim 1, wherein
    each of a subset of the plurality of stations comprises a personal computer, and
    the communications channel comprise any of a LAN, WAN, and Internet.

13. The improved conference call system of claim 12, wherein
    each of a subset of the plurality of stations additionally comprised a telephone, and
    the communications channel is additionally comprises a switched telephone network.

14. The improved conference call system of claim 1, further comprising:
    at least one monitor station having a monitor output and a monitoring user, wherein
    the conference server selectably grants to the at least one monitor station access to a selectable one of the at least one conference call, sends to the monitor station accessing the selected conference call a monitoring processed aggregation of the received voice input from the stations accessing the conference call, the monitoring processed aggregation having a greater portion of voice input from the at least one designated station, and
    the accessing monitor station sends the monitoring processed aggregation to the respective monitor output.

15. An improved conference call system having
    a plurality of stations each having a voice input, an audio output, and a user,
    a conference server able to support at least one conference call, and
    a communications channel connecting each station to the conference server; wherein
    conference server selectably grants to each station access to a selected one of the at least one conference call,
    each station accessing the selected conference call sends to the conference server the respective voice input,
    the conference server sends to each station accessing the selected conference call a processed aggregation of the received voice input from the other stations accessing the selected conference call, and
    each station accessing the selected conference call sends the respective processed aggregation to the respective audio output;
    the improvement comprising:
        the conference server sending to a selecting station of the plurality of stations, a list of conference call data representing a subset of the at least one conference call, and
        the selecting station having a means to selectably send conference call selection data, designating the selected conference call.

16. The improved conference call system of claim 15, further comprising:
    the conference server having a subscription database listing subscription data for each user and subscription requirements for each of the at least one conference call, and
    the subset of the at least one conference call is restricted to those having subscription requirements that are met by the subscription data of the user of the selecting station.

17. The improved conference call system of claim 15, further comprising:
    each of the at least one conference call classified in at least one category,
    the selecting station having a means of choosing a selected category from the at least one category,
    the subset of the at least one conference call being restricted to those classified in the selected category.

18. The improved conference call system of claim 17, wherein
    the at least one category is comprised of a hierarchical category.

19. The improved conference call system of claim 15, further comprising:
    each station having a calling location,
    each of the at least one conference call having a conference location and a location restriction,
    the subset of the at least one conference call being restricted to those having the location restriction met by
    the calling location of the selecting station and
    the conference location, wherein
    the location restriction has a maximum distance, and is met when the distance from the calling location to the conference location is less than the maximum distance.

20. The improved conference system of claim 19, wherein
    the conference location is an average of the calling location of each accessing station.

21. The improved conference system of claim 19, wherein the conference location is a geographic position.

22. The improved conference system of claim 19, wherein the conference location is the location of a particular station.

23. The improved conference call system of claim 15, further comprising:
   each of the at least one conference call having a list of invitations,
   the subset of the at least one conference call being restricted to those having at least one of the selecting station and the user of the selecting station on the respective list of invitations.

24. An improved conference call system having
   a plurality of stations each having a voice input, an audio output, and a user,
   a conference server able to support at least one conference call, and
   a communications channel connecting each station to the conference server; wherein
   the conference server selectably grants to each station access to a selected one of the at least one conference call,
   each station accessing the selected conference call sends to the conference server the respective voice input,
   the conference server sends to each station accessing the selected conference call a processed aggregation of the received voice input from the other stations accessing the selected conference call, and
   each station accessing the selected conference call sends the respective processed aggregation to the respective audio output;
   the improvement comprising:
      one of the plurality of stations transacting with the conference server to specify data representative of a new conference call to the conference server,
      the new conference call data comprising at least one of a topic, an interval, an initial speaker, an initial moderator, an access criterion, a conference location, and a specification for the rules of order; and
      the conference server creating from the new conference call data a new one of the at least one conference call.

25. The improved conference call system of claim 24, wherein:
   data representative of the new conference call additionally comprises at least one invitation to the new conference call.

26. The improved conference call system of claim 25, wherein:
   one of the plurality of stations, having an invitation to the new conference call, transacting with the conference server to specify a new invitation to the new conference call.

27. A method for conducting a conference call having a plurality of participants comprising the steps of:
   each participant selectably requesting designation as the current speaker,
   designating at least one of the requesting participants as the current speaker, and
   providing to each non-designated participant a processed aggregation of the voices of all of the other participants, the processed aggregation having a greater portion of the voice of the current speaker.

28. The method for conducting the conference call of claim 27, further comprising the step of:
   designating a different participant as the current speaker at the end of a fixed period of time.

29. The method for conducting the conference call of claim 27, further comprising the step of:
   designating a different participant as the current speaker upon the current speaker yielding the designation.

30. The method for conducting the conference call of claim 27, 28 or 29, wherein:
   the participant designated to be the current speaker is the least recently requesting participant.

31. The method for conducting the conference call of claim 28 or 29, wherein:
   the participant designated to be the different current speaker is selected by the current speaker from among a group comprised of the requesting participants.

32. The method for conducting the conference call of claim 31, wherein:
   the group is additionally comprised of at least one of the participants previously designated.

33. The method for conducting the conference call of claim 27, further comprising the step of:
   displaying to each participant speaker data representing the current speaker.

34. The method for conducting the conference call of claim 33, further comprising the step of:
   each participant selectably providing rating data representing a reaction that is one of positive or negative concerning the current speaker.

35. The method for conducting the conference call of claim 34, further comprising the step of:
   upon at least one participant providing at least one negative reaction to the current speaker, designating a different participant as the current speaker.

36. The method for conducting the conference call of claim 34, further comprising the steps of:
   recording the rating data respective to current speaker and the participant providing the rating data,
   providing to a selecting participant a subset of a list of available conference calls, wherein the subset excludes those for which an accessing participant is associated with negative rating data provided by the selecting participant,
   choosing a selected conference call from the subset, and
   granting access to the selecting participant into the selected conference call as a participant.

37. The method for conducting the conference call of claim 27, further comprising the steps of:
   admitting at least one monitor to the conference call, and
   providing to each monitor a monitoring processed aggregation of the voices of all of the participants,
   the monitoring processed aggregation having a greater portion of the voice of the current speaker.

38. A method for a selecting participant to access a conference call, comprising the steps of:
   providing to the selecting participant a list of conference call data representing a subset of conference calls available,
   receiving from the selecting participant a designation of the conference call from the list,
   granting access to the selecting participant into the conference call as a participant.

39. The method for the selecting participant to access the conference call of claim 38, further comprising the steps of:
   examining a subscription database listing subscription data of the selecting participant and subscription requirements for the conference calls available, wherein the list of conference call data is restricted to those having subscription requirements met by the subscription data of the selecting participant.

40. The method for the selecting participant to access the conference call of claim 38, further comprising the steps of:
placing each of the conference calls available into at least one category,
the selecting participant selecting a category, wherein the list of conference call data is restricted to those belonging to the selected category.

41. The method for the selecting participant to access the conference call of claim 40, wherein
the at least one category is comprised of a hierarchically identified category.

42. The method for the selecting participant to access the conference call of claim 38, further comprising the steps of:
determining the location of the selecting participant,
assigning to each of the conference calls available a location and a location restriction, wherein
the list of conference call data is restricted to those representing conference calls having the location restriction met by the location of the selecting participant and the location of the respective conference call, and
the location restriction comprises a maximum distance, and is met when the distance from the location of the selecting participant to the location of the respective conference call is less than the maximum distance.

43. The method for the selecting participant to access the conference call of claim 42, wherein
the location of the respective conference call is an average of the locations of the participants.

44. The method for the selecting participant to access the conference call of claim 42, wherein
the location of the respective conference call is a geographic position.

45. The method for the selecting participant to access the conference call of claim 42, wherein
the location of the respective conference call is the location of a particular participant.

46. The method for the selecting participant to access the conference call of claim 38, further comprising the steps of:
selectably providing each of the conference calls available with a list of invitations, and wherein
the list of conference call data is restricted to those having a list of invitations of which at least one is for the selecting participant.

47. A method for a creating participant to create a conference call comprising the steps of;
sending new conference call data to a conference server, the new conference call data comprising at least one of: a topic, an interval, an initial speaker, an initial moderator, an access criterion, a conference location, and a specification for the rules of order;
in response to which the conference server creates the conference call conforming to the new conference call data.

48. The method for the creating participant to create the conference call of claim 47, wherein
the new conference call data additionally comprises an invitation for an invited participant to the conference call, in response to which
the conference server records the invitation.

49. The method for the selecting participant to create the conference call of claim 48, additionally comprising the step of:
the invited participant requesting the conference server to generate a second invitation for a second invited participant to the conference call, in response to which
the conference server generates the second invitation.

50. The improved conference call system of claim 1, further comprising:
each non-designated station having a means to selectably send to the conference server a request to interrupt the designated station, and
the conference server selectably reacting to the request for interrupt from an interrupting station accessing the selected conference call by designating the interrupting station.

51. The improved conference call system of claim 50, further comprising:
each station accessing the selected conference call having a respective permission to interrupt,
the conference server selecting to reacting to the request for interrupt on the basis of the permission to interrupt of the interrupting station, and
upon the designation being granted to the interrupting station, the respective permission to interrupt is reduced.

52. The improved conference call system of claim 51, further comprising:
a station accessing the selected conference call designated as the moderator station, wherein
the respective permission to interrupt of the moderator station is greater than that of the other accessing stations.

53. The improved conference call system of claim 50, 51, or 52, further comprising:
the conference server re-designating the previous designated station at the end of a fixed period of time.

54. The improved conference call system of claim 50, 51, or 52, further comprising:
the interrupting station, when designated, having a means to selectably send to the conference server a request to yield designation, and
the conference server, upon receiving the request to yield designation, re-designating the previous designated station.

55. The method for conducting the conference call of claim 27, further comprising the steps of:
accepting from an interrupting participant of the non-designated participants an interrupt request, and
selectably reacting to the interrupt request by designating the interrupting participant as the current speaker.

56. The method for conducting the conference call of claim 55, further comprising the steps of:
assigning to each participant a permission to interrupt,
reducing the respective permission to interrupt of the interrupting participant upon designating the interrupting participant as the current speaker, and
reacting to the interrupt request based on the permission to interrupt.

57. The method for conducting the conference call of claim 56, further comprising the steps of:

designating a moderator from the participants accessing the conference call, the respective permission to interrupt of the moderator being greater than the other participants.

58. The method for conducting the conference call of claim 55, 56, or 57, further comprising the step of:

re-designating the previous current speaker at the end of a fixed period of time.

59. The method for conducting the conference call of claim 55, 56, or 57, further comprising the steps:

the interrupting participant yielding, and re-designating the previous current speaker.

* * * * *